United States Patent [19]
Hamilton-Piercy et al.

[11] Patent Number: 5,809,395
[45] Date of Patent: Sep. 15, 1998

[54] REMOTE ANTENNA DRIVER FOR A RADIO TELEPHONY SYSTEM

[75] Inventors: Nicholas Francis Hamilton-Piercy, Aurora; George Maynard Hart, Newmarket; Edward O'Leary, Ajax, all of Canada

[73] Assignee: Rogers Cable Systems Limited, Toronto, Canada

[21] Appl. No.: 477,375

[22] Filed: Jun. 7, 1995

Related U.S. Application Data

[63] Continuation-in-part of Ser. No. 820,491, Jan. 14, 1992.

[30] Foreign Application Priority Data

Jan. 15, 1991 [GB] United Kingdom ............... 9100774
Sep. 9, 1991 [GB] United Kingdom ............... 9119229

[51] Int. Cl.$^6$ ................... H04M 11/00; H04J 3/00
[52] U.S. Cl. ................... 455/4.1; 455/6.3; 455/20; 370/489
[58] Field of Search ............... 370/18, 489; 379/58, 379/59; 455/4.1, 33.1, 6.3, 20

[56] References Cited

U.S. PATENT DOCUMENTS

| | | | |
|---|---|---|---|
| 4,658,096 | 4/1987 | West, Jr. et al. ............. | 379/59 |
| 4,747,160 | 5/1988 | Bossard ................... | 455/33.1 |
| 4,757,496 | 7/1988 | Bartholet et al. . | |
| 4,951,313 | 8/1990 | Gysel ..................... | 380/10 |
| 4,959,862 | 9/1990 | Davidov et al. ............ | 380/10 |
| 5,067,173 | 11/1991 | Gordon et al. . | |
| 5,088,111 | 2/1992 | McNamara et al. ......... | 375/18 X |
| 5,124,980 | 6/1992 | Maki ..................... | 370/77 |
| 5,153,763 | 10/1992 | Pidgeon .................. | 359/125 |
| 5,177,604 | 1/1993 | Martinez ................. | 455/45 X |
| 5,233,418 | 8/1993 | Gumm et al. ............. | 455/67.4 X |
| 5,251,053 | 10/1993 | Heidemann .............. | 379/58 X |
| 5,485,630 | 1/1996 | Lee et al. ................ | 455/4.1 |

OTHER PUBLICATIONS

Faris Howat, Cell Like Performance using the Remotely Controlled Cellular Transmitter, Vehicular Technology 1989 Conference, pp. 535–541, Jan. 1989.
Donald M. Fye, Design of Fiber Optic Anetnna Remoting Links for Cellular Radio Applications, Vehicular Technology 1990 Conference, pp. 622–625, Apr. 1990.

*Primary Examiner*—David R. Hudspeth
*Assistant Examiner*—Scott Richardson
*Attorney, Agent, or Firm*—Reid & Priest LLP

[57] ABSTRACT

A multichannel radiotelephony system provides two way cordless communications with a plurality of multichannel transceivers portable within a coverage area comprised by a plurality of cells, each associated with a base station and antennas, such as to permit channel frequency reuse in cells within the coverage area. For at least part of the coverage area, the locations of the antennas within the cells and the locations of the base stations are independently mapped, the antennas being associated with active antenna systems and the active antenna systems being connected to the base stations utilizing broadband transmission by means of a fixed bi-directional signal distribution network. The network is connected to the base stations and the antenna systems through suitable interfaces incorporating frequency translation so that available frequency bands in the signal distribution network which will normally be shared with other services, may be utilised. Plural base stations may be co-located. The radio link to the transceivers may be frequency or time division multiplexed, but communication over the network will normally be frequency multiplexed, using separate bands for transmission and reception.

17 Claims, 13 Drawing Sheets

REMOTE ANTENNA DRIVER FOR A RADIO TELEPHONY SYSTEM

REFERENCE TO RELATED APPLICATION

This application is a continuation-in-part of our copended application Ser. No. 07/820,491 filed Jan. 14, 1992.

FIELD OF THE INVENTION

This invention relates to the interface between a telephone network and wireless mobile telephone units in a radiotelephony system and more particularly to equipment for the implementation of a mobile communications service utilizing a fixed distribution network incorporating a layer between base stations and associated antennas, the layer incorporating two way optical fibre and/or coaxial cable signal transport facilities.

REVIEW OF THE ART

The development and commercial success of mobile radiotelephony services through the existing cellular system, particularly in urban centres, is requiring mobile service providers to increase substantially the traffic carrying capability of their networks and at the same time address the needs of the users by providing a portable grade of service. With the decreasing cost of portable mobile units and a market demand for personal communications, service providers need to develop means to support increased traffic demand in high usage urban areas in a cost effective manner.

Portable grade service in urban centres can be described as a service which provides users with adequate personal cordless communications service at the street level, in enclosed and underground public areas (e.g. malls, parking lots and subways), and within office buildings, as well as in vehicles.

High capacity, low cost portable grade radiotelephone service will place additional burdens on the urban cellular frequency spectrum. Additionally, the cost of sites for radio base stations and antenna installations, and difficulties in construction and maintenance access during busy road traffic periods, require a more cost effective means for providing wireless communications if the urban demand for service is to be met.

A common objective of the cellular radiotelephony system and proposed Personal Communication Systems (PCS) is the provision of quality wireless telephony, with minimum infrastructure and a large user capacity. Wireless telephony is made possible by way of mobile radio units, either vehicle mounted, transportable or portable, and associated multi-access base stations connected to a mobile radiotelephony network infrastructure. The mobile network infrastructure consists of several network layers; mobile access, transport, switching and signalling.

Industry standards and proposals have been published for cellular radiotelephony and mobile data technology, as well as proposals for Personal Communications Systems (PCS) commonly referred to as the second generation cordless telephony (CT-2), third generation cordless telephony (CT-3), and CDMA (code division multiple access) wireless communications. Further information on such systems may be found, for example, in the following publications:

"The Bell System Technical Journal" Vol. 58, January 1979, Number 1, "Advanced Mobile Phone Service", published by the American Telephony and Telegraph Company.

Communications Canada, Standard Radio System Plan SRSP-503 Issue 2, Released Oct. 11, 1990, "Technical Requirements For Cellular Radiotelephone Systems Operating in the Bands of 824–849 MHz and 869–894 MHz".

Communications Canada, Radio Standards Specifications RSS-118 "Radio Telephone Transmitters and Receivers Operating in the 825–890 MHz Cellular Mobile Bands", Issue 2.

Communications Canada, Radio Standards Specifications, RSS-122 Issue 1 Provisional, "Land and Mobile FM or PM Telephones Operating In The Allocated Bands In The 400–960 MHz Range Using 12.5 KHz Spacing".

Mobitex Operators Association, Issues MTS01 A.5–D.5 "Mobitex Terminal Specification" Feb. 26 and Aug. 17, 1990, Published by the Mobitex Operators Association.

EIA/TIA IS-54 (Revision A) "Cellular System, Dual-Mode Mobile Station—Base Station Compatibility Standard". January 1991, Published by the Electronic Industries Association (EIA).

EIA Interim Standard, IS-3-D "Cellular System, Mobile Station—Land Station Compatibility Specification", March 1987, Published by the Electronics Industries Association (EIA).

EIA Interim Standards, IS-20-A "Recommended Minimum Standards for 800 MHz Cellular Land Stations", May 1988, Published by Electronic Industries Association (EIA).

EIA Interim Standard, "Cellular Radio telecommunications Inter System Operations: Functional Overview", IS-41.1, February 1988, Published by Electronic Industries Association (EIA).

EIA Interim Standards, IS-41.5, "Cellular Radio telecommunications Inter System Operations: Data Communications," February 1988, Published by Electronic Industries Association (EIA).

"Personal Communications—A report of CT-2 & PCN Wireless Communications Systems" by Matthew Dosch, published 1990 by Telecom Publishing Group.

"Generic Framework Criteria for Universal Digital Portable Communications Systems (PCS)", published 1990 by Bellcore.

"MPT-1375 Common Air Interface Specifications", published by Dept. of Trade & Industry, London, England, 1989.

"CT-2 Plus—A Proposal for a Canadian Common Radio Interface Standard", Issue 2.0, December 1990, Bell Northern Research.

"CT-3—Common Radio Interface Specification for Canadian Cordless Communications", Dec. 19, 1990, NovAtel Communications Inc.

"CDMA—A Proposal for the Application of Code Division Multiple Access to Digital Cordless Telecommunications as a Canadian Common Radio Interface Standard", Feb. 1, 1991, Qualcomm Inc.

"Characterization of Cable TV Networks as the Transmission Media for Data" March 1985, Archer S. Taylor, IEEE Journal on Selected Areas in Communication.

A common objective of a mobile radiotelephony system, whether one or a combination of cellular, PCS or mobile data technology, is the provision of wireless communications via mobile radio terminals to individuals or businesses, whether in vehicles, pedestrian or stationary. It is desired that wireless services be available at low cost to the general public and operate within and about homes, shops, schools, offices, institutions, along major highways, and generally in locations where telephone usage is most likely to be required. Wireless radiotelephony is made possible by means of portable radio terminals carried on the person or fixed in a vehicle, communicating with radio base stations connected to the public switched telephone network (PSTN) or other portable radio terminals, through a network controller, e.g. a Mobile Telephone Switching office (MTSO) in the case of a cellular network. Traffic demands and a limited available radio spectrum make imperative a channel allocation system such that efficient use is made of available channels. This in turn makes it necessary that the terminals and the distribution system have a multiple channel capability.

The interconnection of the network controller to many spatially distributed radio base stations is achieved through a transport network using various transmission media; coaxial cable, microwave radio links, and fibre optical links being the most common. A large number of radio base stations (RBS) need to be deployed over a substantial area to support adequate radio access for the general public. Each RBS transforms, in a duplex manner, voice and control data in a format suitable for transmission on an electrical or optical transmission facility into or from radio frequency (RF) signals suitable for exchange with the mobile radio unit.

The available radio frequency spectrum is subdivided into a number of discrete RF channels. Frequency Division Duplex (FDD) techniques are used for current analog cellular systems. The next generation of cellular systems will incorporate digital modulation techniques and Time Division Multiple Access (TDMA) to multiplex several traffic channels into each RF channel. In all cases traffic channels are processed individually at the RBS, multiplexed onto the transmission network, de-multiplexed at the Mobile Network Controller, processed and routed to another mobile radio unit or to the Public Switched Telephone Network (PSTN).

Existing cellular telephone network design is based on the underlying need to re-use radio frequencies within a given geographical area so as to make efficient and effective use of the available radio spectrum. The number of RBS sites within a given geographical area is dependent upon the mobile access demands on the cellular network. Frequency re-use techniques have been developed using guidelines which indicate the quality of service which will be achieved based upon the distance between sites operating on the same radio frequencies. As traffic demands increase, additional RBS sites must be added in a controlled geometric pattern to the cellular network to absorb the traffic and to ensure controlled spacings between RBS sites to ensure that frequency re-use design rules are observed.

This technique of adding RBS sites to the cellular network, following a geometric grid pattern to control network performance and meet the traffic demands, is known as cell splitting.

As the urban mobile radiotelephony network matures, the ability of a cellular service provider to locate, construct and operate additional conventional RBS sites becomes increasingly difficult and costly. Site access for maintenance purposes, which may be required at any time, also becomes a problem. Finding a site in a building at the desired geometric grid point or desired coverage location does not guarantee success. Antenna height is a critical factor in controlling radio propagation and thus frequency re-use. Techniques such as electrical and mechanical antenna down tilt can be used to control RF signal propagation and maintain the critical distance relationship between RBS sites using the same frequencies. Decreased RF signal power reduces the effective size of the cell, at the expense of the in-building penetration required to provide a portable grade of service. Antenna system aesthetics are a significant factor in the negotiation process for urban property. Municipalities, the general public, and land owners are sensitive to the presence of antenna structures and equipment shelters in their backyards and on roof tops.

In addition to the technical and physical problems which mobile network operators are facing today, the signal transport network is becoming more troublesome for those operators using microwave radio links as part of their transmission facilities. The number of operators using the 18 & 23 GHz bands for short distance transmission facilities in urban areas is increasing rapidly. This growth in microwave radio facilities and the ever changing skyline in urban centres lead to increasing problems with microwave radio spectrum congestion and the potential for radio link path blockage.

To meet the demands for cellular telephone service in urban areas, "microcellular" techniques have been employed to increase system capacity and provide selective coverage penetration. A microcell operates in the same way as a conventional cell site but with lower radio transmitter power, thus reducing the cell coverage area. The reduced output of the microcell site facilitates high density frequency re-use throughout an urban area, and thereby achieves high user capacity. Microcellular techniques require however a much larger number of radio base stations to provide service and an extensive interconnection network between them.

The above problems are common to area coverage radiotelephony systems, whether conventional cellular networks or Portable Communication Systems (PCS), with their requirement for numerous spatially distributed base stations in order to provide coverage and penetration over a substantial area. The reduced power of urban cellular base stations, due to frequency re-use limitations, and the limited range of low power PCS handsets, makes the coverage problem more acute, particularly if any substantial degree of user mobility within indoor public areas is to be provided.

The bi-directional transport of signals on two-way coaxial cable using CATV facilities is well documented in the prior art. Conventionally, signal conveyance is at radio frequencies greater than 50 MHz from an originating location (the headend) or relay points (hubs), downstream to residences and businesses: upstream conveyance is at frequencies in the range 5 to 30 MHz from residences and businesses to the hub or headend. The signals are conveyed to and from homes, businesses and public areas via single coaxial cable drops which are connected to coaxial feeder lines by two-way signal couplers.

It is known in the case of cellular radio systems to utilize fibre optic trunks associated with CATV systems to provide signal distribution to base stations of a cellular system, as described in an article "Rogers Fibre Architecture" by George Hart and Nick Hamilton-Piercy, CED Magazine, July 1989. Various other proposals have also been made for the provision of telephony services making use of the existing fixed plant of CATV Systems, particularly those having two-way capability. An article "Cellular Radio and Cable TV—Cellular Cable", also points out that existing two-way CATV systems, particularly those using fibre technology, can replace conventional twisted pair plant in the transmission of telephone communications. The article suggests (no details are provided) that a CATV system might in effect replace the transmitter of a cellular base station with the signal being distributed by cable instead of broadcast, analogously to the distribution rather than broadcast of television and radio signals by the system, but making use of its two-way capability. A system operating generally on these principles is disclosed in U.S. Pat. No. 4,757,496 (Bartholet), which discloses frequency-agile stations connected to a coaxial cable network in a manner such as to replace conventional twisted pair local distribution of telephone signals. U.S. Pat. No. 4,644,526 (Wu) discloses a device for connection of a station to a network, which may be implemented by coaxial cable, by translating between a single frequency time division duplex and separate signals carried on different sidebands of a common carrier.

The architecture and technology of typical CATV systems is described further in "Cable Television System Overview 1987" published Sept. 14, 1987 by American Television & Communication Corporation, Englewood, Colo. Further discussion of two-way CATV systems is to be found in Chapter 12 of the book "Cable Television", 2nd edition, by John E. Cunningham, published 1980 by Howard W. Sams.

The transport of analog and digital signals using optical fibres is well documented in the prior art. Optical fibre trunks have been used by CATV operators to provide quality signals at low loss to distribution hubs.

U.S. Pat. No. 4,932,049 (Lee) discloses a cellular telephone system in which multiple spatially separated antenna sites are provided within a cell, connected to a single base station by coaxial cable, optical fibres or microwave links. An additional antenna at each site receives signals of which the strengths are monitored by a scanning receiver at the base station so that, for any channel, the base station utilizes only transmission and reception antennas at that site determined by the scanning receiver to provide the best received signal on t hat channel. Whilst such a macro-diversity system can provide valuable advantages in increasing system capacity and improving cell coverage, it requires continuous monitoring of the multiple antennas, through the scanning receiver, and careful siting of the antennas to exploit the advantages of the system. It should be noted that never more than one antenna site within the cell will handle the normal transmission and reception of signals on a particular channel at any one time. Proper operation of, and, the base station within the cell involves cooperative use of all the antennas.

U.S. Pat. No. 4,916,460 (Powell) discloses a distributed antenna system utilized for relaying radio signals to and from an enclosed area, the system having a local receiver for receiving signals from a remote transceiver, and optical cables connecting the local transceiver to a number of further transceivers in the enclosed area.

Proposals have also been made for providing access to a PSTN from portable radiotelephones within a microcell by utilizing radio signals passed to or from distributed antennas within the microcell by modulation of light signals distributed by optical fibres.

SUMMARY OF THE INVENTION

To date, however, no system has been proposed which can make effective use of the extensive and growing bi-directional networks of coaxial and fibre optical cables already existing or installed, particularly in urban and suburban areas, for cable television and data communication purposes.

Essential functions of any area coverage multichannel radiotelephony network featuring a cellular structure and frequency reuse are performed by the base stations which provide an interface between a switching network handling the routing of calls within the network and the radio links to portable transceivers operating within the network. Regardless of how channel allocations and reallocations for these radio links are determined and supervised, the actual signal handling involved in transferring signals to, from and between selected channels is performed by the base stations. The present invention is based on the realization that the locations of the base stations as seen by the network, and the locations of base stations as seen by the portable transceivers, need not be coincident nor even close to one another, provided that a bi-directional, broadband signal transportation network is available to connect the two sets of locations. By means of active antenna systems linked to such a transportation network, images of the base stations can be mapped to produce virtual base stations forming or completing a desired cellular structure, independent of the location of actual base stations, and at least a substantial part of the signal transportation within the network can be performed utilizing available broadband bi-directional signal transportation networks such as CATV networks or optical fibre data networks. Since the active antenna systems handle broadband signals and have no responsibility for determining the channels in which signals are handled, they can be much less complex and require less maintenance access than conventional base stations, which facilitates site selection in various respects. Conversely, the real base stations may be located to suit the convenience of the operator, at locations where maintenance is facilitated and with less regard for the availability of suitable adjacent antenna locations.

By the term active antenna systems we mean systems including at least one antenna, at least one power amplifier for amplifying signals received over a signal transportation network to provide a required input power to the antenna, at least one preamplifier for pre amplifying signals received by the at least one antenna, for transmission over the signal transportation network, and a bi-directional interface to the transportation network. Such active antenna systems may take various forms, such as the optically and coaxially connected microcell base stations and remote antenna drivers described below. Such systems provide virtual base stations as described above which image the capabilities of the base station equipment to which they are connected without themselves incorporating such equipment.

Such an arrangement, although it can incorporate macrodiversity techniques, is to be distinguished from such techniques in that none of the multiple antennas in an arrangement such as that described in U.S. Pat. No. 4,932,049 provides a virtual base station as discussed above: rather the multiple antennas together all form necessary parts of the real base station. Likewise, it goes beyond the mere use of the optical fibres to relay transmissions at radio frequency to provide local extensions of the coverage of an individual base station, although again such techniques can be incorporated into, a system according to the invention. The invention therefore is primarily directed to the exploitation of a coaxial or fibre optical cable network in order to permit a substantial degree of independence to be achieved between the mapping of virtual locations of base stations within a multichannel radiotelephony network having a cellular structure to permit frequency reuse, and the actual location of such stations, and to signal processing arrangements and components useful in providing such capability.

Accordingly the invention provides a multichannel radiotelephony system for providing two way cordless communications with a plurality of multichannel transceivers portable within a coverage area comprised by a plurality of cells, each associated with a base station and antennas, such as to permit channel frequency reuse in cells within the coverage area, wherein, for at least a substantial part of the coverage area, the locations of the antennas within the cells and the locations of the base stations are independently mapped, the antennas being associated with active antenna systems and the active antenna systems being connected to the base stations utilizing broadband transmission by means of a fixed bi-directional signal distribution network connected to the base stations and the antenna systems through interfaces incorporated therein.

The invention also extends to a method of providing area coverage with frequency reuse in a multichannel radiotelephony system, the coverage area being mapped into cells each associated with a multichannel base station, wherein the base stations are located at least in part independently of the mapping of the cells, the independent mapping of the cells is performed by location of active antenna systems, and the active antenna systems and the base stations are connected through interfaces to a bi-directional signal transportation network.

In each instance, plural base stations utilizing the same channels are preferably co-located.

In accordance with one aspect of the present invention, we provide a radiotelephony interface in which area coverage of multichannel radio base station equipment is at least partly defined by connecting it to a plurality of virtual base stations formed by active antenna systems using broadband frequency division duplex transmission of transmitted and received signals between the base station equipment and the active antenna systems over a fixed bi directional cable television network, in frequency bands available in such a network for downstream and upstream communications respectively.

Signal transportation may be not only by means of a bi directional cable television network but by any electrical or optical cable network capable of maintaining bi directional transmission of frequency division duplexed signals, and having portions of its available transmission bandwidth available suffcient to accommodate frequency blocks of the width used by the radiotelephony system. The signal distribution network may be formed by optical fibres, coaxial cable, microwave radio links or a combination of these.

According to the invention in a further aspect, there is provided a radiotelephony interface for use in a radiotelephony system which reutilizes channels within at least one radio frequency spectrum portion to establish bi-directional wireless communication between multiple mobile transceiver units and a switching network, the interface comprising a fixed signal transportation network having available bandwidth sufficient to transport signals within at least one frequency spectrum portion, the network being interposed between on the one hand at least one base station equipment at a first location and capable of transmitting and receiving multiple channels within at least one defined frequency spectrum portion, the base station equipment including at least one receiver for each channel allocated for reception and at least one transmitter for each channel allocated for transmission as well as means to assign a transmitter and receiver to each mobile transceiver unit in communication with the base station equipment, and on the other hand multiple active antennas at multiple locations, said interface further including bi-directional coupling means between said radio base station equipment and said transportation network establishing a defined relationship between frequency spectrum portions available on the transportation network and those used by the base station equipment, and bi-directional amplification means between said network and said antennas, said bi-directional amplification means establishing a defined relationship between frequency spectrum portions available on the transportation network and each frequency spectrum portion utilized by the radiotelephony system, these defined relationships being independent of the identity of the transmitter and the receiver allocated to a mobile transceiver unit by the base station equipment. Usually the fixed signal transportation network will be shared at least in part with other services, such as CATV or data services.

The invention also extends to a radiotelephony interface for use in a multi-channel radiotelephony system to establish wireless communication between a signal switching centre and multiple mobile transceiver units, the interface comprising a bi-directional fixed signal distribution network extending from multiple multi-channel base stations for transmitting and receiving signals in multiple channels under control of said switching centre, and antenna units associated with said base stations for establishing local wireless links for said transmitted and received signals between points on said signal distribution network and said mobile transceiver units, wherein a substantial proportion of said antenna units comprise active antenna units remote from the base stations and connected thereto by multi-channel signal links such as to present each of said plurality of active antenna units as a virtual radio base station, communication over said signal distribution network being in available portions of the bandwidth of the network, frequency translation means being provided as required between said base stations and said network, between said network and said active antenna units, and within said network.

The difficulties associated with the construction of radiotelephony systems may be significantly reduced by the use of this invention. The transport of radiotelephony signals using radio frequencies over fibre optic, coaxial and CATV facilities, available in abundance in urban centres, provides the radiotelephony service providers the means for distribution of said signals, transparently to designated locations at a substantially lower cost than would be otherwise obtained.

By utilizing the above-mentioned transport systems to distribute the radio signals of a base station or group of base stations between a common equipment location (Radio Base Station Warehouse (RSBW) to designated cell or microcell sites, the radio transmitting and receiving equipment and associated hardware required at the cell or microcell site can be greatly simplified. If the RBS Warehouse is located at a fibre and coaxial cable system node, large areas can be served by using simplified spatially distributed radiotelephony microcell equipment. The RBS equipment located at the RBS Warehouse incorporates the means to provide channelled transmission and reception in the appropriate frequency bands for interfacing to coax, CATV and fibre optic cable systems. The sophistication associated with the frequency agility necessary in modern radiotelephony systems servicing mobile or portable transceivers is concentrated in the RBS equipment, the distribution network between the RBS equipment and the antennas, and the associated antenna interface devices being broadband.

The Optically Connected Microcell System (OCMS) or the Coaxially Connected Microcell System (CCMS) to be described is in effect a transparent low loss transmission system between RBS equipment, located at a common equipment site, and mobile radiotelephony units, which enables a much greater separation between radiotelephony mobile and the RBS equipment. Thus a multiplicity of Optically Connected Microcell Base Stations (OCMBS) and/or Coaxially Connected Microcell Base Stations (CCMBS) may be connected to the coaxial or optical fibre cable facilities throughout a community or urban centre to provide radiotelephony services, with the effect of providing virtual radio base stations at multiple sites, even though the radio base stations themselves may be concentrated in only a few, or even a single site.

In general, the RF frequencies allocated for cellular, PCS and mobile data radiotelephony cannot conveniently be directly conveyed over substantial distances on fibre or coaxial cable facilities, and so the principal function of the OCMBS and the CCMBS is to translate the allocated RF frequencies either to frequencies suitable and available for modulating optical signals for transport on fibre facilities or radio frequencies suitable and available for transport on coaxial facilities. The bandwidth and range of frequencies which each OCMBS and CCMBS can accommodate should be sufficient to allow operation on all channels allocated to the specific type of service provided. All OCMBS and CCMBS use functionally compatible translation systems to ensure that any mobile radiotelephony device (Cellular, PCS, Mobile Data), within communication range of an OCMBS or CCMBS can communicate with any free base station on any free channel, as required for normal operation of Cellular, PCS and Mobile Data radiotelephony systems, just as if the mobile radiotelephony device was in the vicinity of a conventional base station.

As part of providing the means for effective utilization of radio frequency spectrum in mobile radiotelephony systems, an RBSW may connect to remote antennas in either a simulcast mode (in order to increase the coverage area of a cell) or in a dedicated channel mode in which different antennas handle independent groups of channels (in order to increase the number of cells). The selected mode of operation is predicated upon the capacity requirements and frequency re-use restrictions specific to the area of desired coverage.

The present invention is illustrated by description of exemplary Optically Connected Microcell Systems (OCMS), and Cable Connected Microcell Systems (CCMS). Although most examples relate primarily to conventional cellular radiotelephony, an example is also provided of an exemplary PCS system, and indeed the invention can be used in any application where the provision of virtual base station coverage is advantageous in a multi-channel radiotelephony system. While transceivers in certain of the systems to be described are those commonly referred to as radiotelephony mobiles, it should be understood that the transceivers may be of any form, whether hand held, mobile, data terminals, or even fixed where a conventional wired telephone circuit cannot be conveniently or economically provided. Where arrangements in which the Common Air Interface (CAI) to the radiotelephony mobiles uses a Frequency Division Duplex (FDD) format are described, these are also applicable to Time Division Duplex (TDD) formats, apart from those features specifically predicated upon the use of FDD, and vice-versa. Both the OCMS and the CCMS are applicable to Frequency Division Multiple Access (FDMA), Time Division Multiple Access (TDMA), and code division multiple access (CDMA) systems with suitable changes of parameters, apart again from those features specifically predicated upon the use of FDMA.

The nature of the upper levels of a radiotelephony network and control system used to control the base stations is significant only to the extent that the receivers and transmitters of the base station equipment must be provided with suitable interface to that network.

Application of the invention also permits telephone service competitive with conventional wired telephone service to be provided over cable television systems, utilizing known cellular switching and network technology to manage call completion; customers can utilize either conventional cellular transceivers. to provide cordless service within range of a low powered remote antenna unit located at their premises, as well as using the same transceivers to provide cellular service elsewhere, or conventional wired equipment may be used in conjunction with a cellular-to-wired adaptor of known type.

Rather than utilizing block conversion of frequencies in bands utilized for the radio interface to frequencies in bands allocated in the cable television system, it may in some instances, particularly when a particular antenna driver is only intended to have very limited coverage area, such as a particular subscriber's premises, to utilize a narrow band antenna driver tune able selectively in a frequency-agile manner to a frequency or frequencies of a selected channel responsive to a control signal, and performing conversions to and from independently selected upstream and downstream cable channels: such an arrangement permits more efficient reuse of both cable and air channels since these may then be allocated independently. Complementary conversions must of course be performed at the base station equipment connected to the cable system.

It should also be understood that, while the invention is described primarily with reference of the provision of telephone service, it may also be applied to the provision of services where data or paying signals are distributed rather than voice signals.

IN THE DRAWINGS

Figure 1:
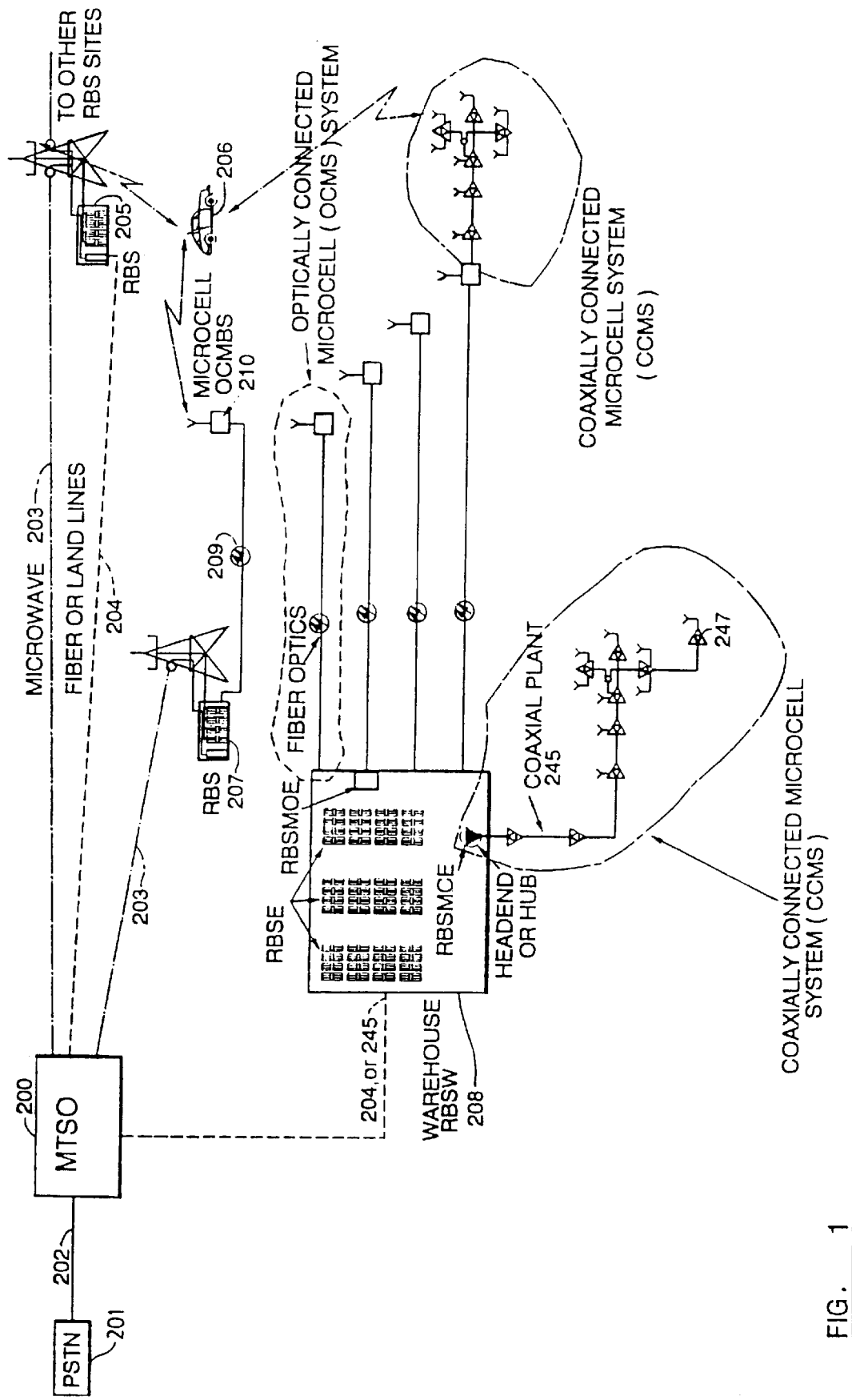
FIG. 1 is a schematic diagram showing part of a Radio Telephony Network (RTN) equipped to incorporate an interface according to the present invention.

FIG. 1 provides an overview of the architecture of part of a cellular mobile radiotelephony system incorporating the invention and includes simplified representations of the various functional network layers and their configurations. The three network layers shown in the diagram are; a switching network represented by the Mobile Telephone Switching Office (MTSO) 200; a transport network represented by microwave links and/or optical fibre and coaxial cable landlines 202, 203, 204; and an access network represented by a conventional Radio Base Station (RBS) 205, Optically Connected Microcell Base Stations (OCMBS) 122, and Coaxially Connected Microcell Base Stations (CCMBS) 247.

In this embodiment of the invention the MTSO 200 provides centralized control of the radiotelephony network. It coordinates and controls the activities of the cell sites, and call switching between a mobile telephone and either a Public Switched Telephone Network (PSTN) 201, to which it is linked by a digital trunk 202, or another mobile transceiver within the radiotelephony network. It also provides system integrity through automated maintenance and network management functions. It will not be described in detail since it may be of design and construction conventional in the cellular radiotelephony art.

In a conventional cellular system, Radio Base Stations (RBS) 205 provide a conventional radio communication interface with the mobiles. They are linked to the MTSO 200 by microwave links 203 or landline transport systems 204. The MTSO supervises the quality of radio connection by monitoring special supervisory tones and makes signal strength measurements of mobiles to enable handoffs from one cell to another cell. The size of the cell service coverage area is predominantly determined by the radiated power of the RBS.

Signals intended for a mobile 206 are routed by the MTSO to an RBS 205 that can adequately serve this mobile with a radio link maintaining sufficient voice and/or data quality. If the mobile radio link degrades, information from the RBS informs the MTSO of impending degradation of service quality. The MTSO then accesses other Radio Base Stations near to RBS 205 to determine whether or not they would be better suited to serve the mobile and maintain the message and/or data circuit. Neighboring RBS sites respond back to the MTSO as to their adequacy as primary server for the mobile. Once the best serving base station, for example RBS 207, has been identified, the MTSO then initiates a handoff sequence which instructs the mobile to tune to a new frequency set in the neighbouring cell controlled by RBS 207. RBS 207 sets up an initial radio link to the mobile and when this is established informs the MTSO. The MTSO then provides the appropriate switching to maintain the voice and data message circuits, thus avoiding a lost or dropped radio link.

Radio transmission to the mobile user is typically preformed in Frequency Division Duplex (FDD) mode, in which the RBS transceiver equipment conveys voice and/or data messages to the mobile in a forward direction and receives voice and/or data messages in the reverse direction, using one set of frequencies for the forward direction and another distinct set of frequencies separated by an appropriate frequency difference, for the reverse direction.

All of the above RBS functions are conventional in the cellular radiotelephony art and are not described in detail.

In FIG. 1, a fibre optical link 209 is shown connecting the RBS 207 to an Optically Connected Microcell Base Station (OCMBS) 210. This remote OCMBS extends the service area of the RBS 207 as described further below so as to enable it to provide a radio link with the mobile 206. Alternatively a coaxial cable transport link 245 to a Coaxially Connected Microcell System (CCMS) could also provide access to a remote location with the appropriate radio interface to the mobile. By using such links to provide locations for what are effectively virtual radio base stations, a number of radio base stations can be cosited or warehoused at a single location or Radio Base Station Warehouse (RBSW) 208, and a multitude of OCMS 210 or CCMS 247 can be interconnected through it to provide radio links to mobiles.

Figure 2:
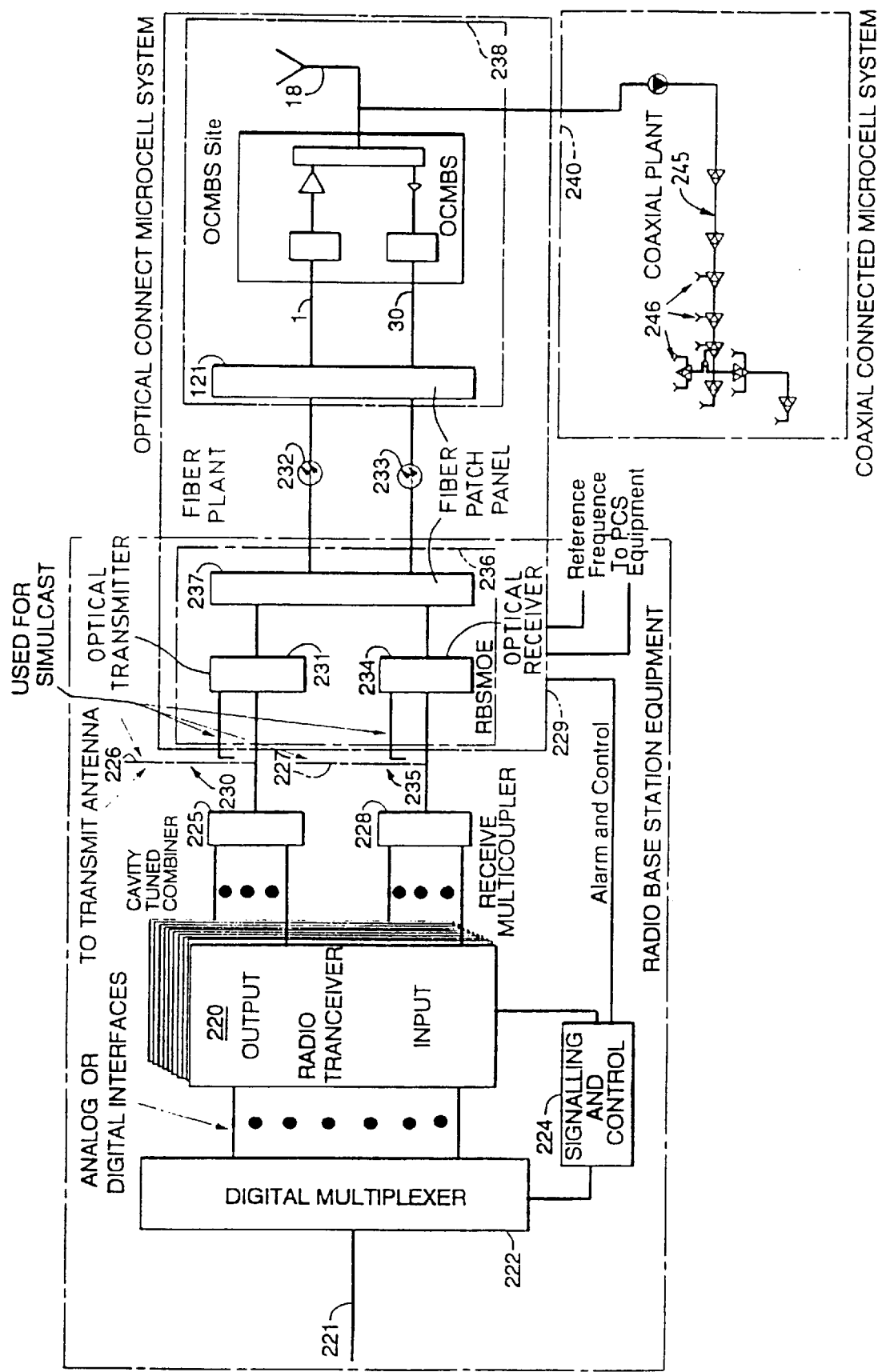
FIG. 2 is a more detailed schematic diagram of an Optically Connected Microcell System (OCMS) included in the system of FIG. 1.

FIG. 2 shows in more detail the RBS 207 and an associated OCMBS 210. The RBS includes conventional multiple radio transceivers 220 for the various channels interconnected to the MTSO 200 via a digital transport link 221 which may be provided by landline 204 or a microwave link 203. The radio transceivers are connected by analog or digital circuits to a digital multiplexer or channel bank 222. Mobile signalling, control and alarm information is also extracted from multiplexer 222 and is used by the MTSO to control the radio transceivers and through them the mobiles to maintain radio links established between them. Alarm information gathered is transported to the MTSO for further manipulation by an operation and maintenance subsystem.

The outputs of the radio transceivers 220 are typically combined by a low-loss tuned-cavity combiner 225. This device is used to minimize losses associated with the combining of multiple high power radio signals. The output of the combiner is fed in a conventional RBS to a transmit antenna 226 at the RBS site from which the RF signals are radiated. Mobiles in the vicinity of the RBS will communicate over the air to the RBS in a conventional manner and their transmissions will be picked up by a receive antenna 227 and applied to a multicoupler 228 for distribution to the multiple radio transceivers 220. The multicoupler provides gain and isolation between the various co-located radio transceivers 220.

The radio coverage from such an RBS site is a function of the output power radiated by the antenna as supplied by a radio transceiver 220. The invention permits either of two modes of operation at a microcell site using respectively simulcast and dedicated transmissions between the RBS and multiple microcell sites to provide radio coverage. Simulcast microcell sites can be used to extend radio coverage into areas not accessible to a primary RBS server, such as buildings, garages, or tunnels, by conveying the RF signals associated with these conventional RBS into and out of these locations. The RF signals are transported and processed by OCMS or CCMS to provide an expanded radio coverage area. This mode of operation improves utilization of available radio channels by providing an improved radio coverage. Dedicated channel microcell sites are used to provide greater traffic capacity and are configured according to frequency reuse and cell-splitting guidelines.

Radio coverage provided by an RBS is subject to the surrounding terrain, including structures and vegetation, and radio coverage holes are frequently encountered. When the available channel capacity of the RBS is sufficient, the radio frequencies associated with the RBS can be simulcast with respect to a radio coverage hole by an OCMS 229. The OCMS transports the RF signals via amplitude modulated optical fiber transmission with respect to the radio coverage hole location, where they are processed to provide coverage. Mobiles in the radio coverage hole communicate with the RBS site via the OCMS. As the mobile leaves the OCMS coverage area it is served by the simulcast RBS radio coverage without any handoff being required from the MTSO, since the mobile is always connected to the same radio transceiver in both the OCMS and the direct RBS coverage area.

Where additional dedicated channels to provide increased capacity are required, then additional radio transceivers can be co-located at an RBS site with existing radio transceivers serving a particular area, to provide service into a radio coverage hole or to provide coverage of smaller radio cells, or alternatively RBS equipment can be housed and grouped into large RBS Warehouses with a multitude of independent feeds to surrounding cells or microcells, i.e. there are multiple transmitters and receivers assigned to each transmission and reception channel, but these are associated with antennas or groups of antennas in different cells.

For simulcast operation, transmitted radio frequencies may be sampled off the main antenna feed by a directional coupler 230, and applied to an optical transducer 231 in a Radio Base Station Microcell Optical Equipment module 236 which uses the electrical signals to modulate the intensity of an optical beam for transmission onto a fiber optical cable 232, which acts as a wave guide for the beam. For dedicated channel operation the output of the cavity tuned combiner 225 is fed directly to the optical transducer 231. Return optical signals from the OCMBS 238 are demodulated to recover radio frequencies by an optical receiver 234 and are applied directly to a receiver multicoupler 228. For simulcast operation the return optical signal is demodulated to recover radio frequencies which are coupled with received signals from a receiver antenna 227 by a directional coupler 235, and applied to the receiver multicoupler, 228. Additional gain is provided following the optical to electrical conversion in receiver 234 to offset the directional coupler loss, thus providing loss-free optical fiber transport from the OCMBS 238.

Although the above description refers to cavity tuned combiners, these are only required when high RF power is output by the radio transceivers 220, which will normally be during simulcast operations where a principal antenna is co-sited with the RBS. When the transceiver does not include a final amplifier it is connected to the optical transmitter(s) and receiver(s) through low-power combiners.

Figure 6:
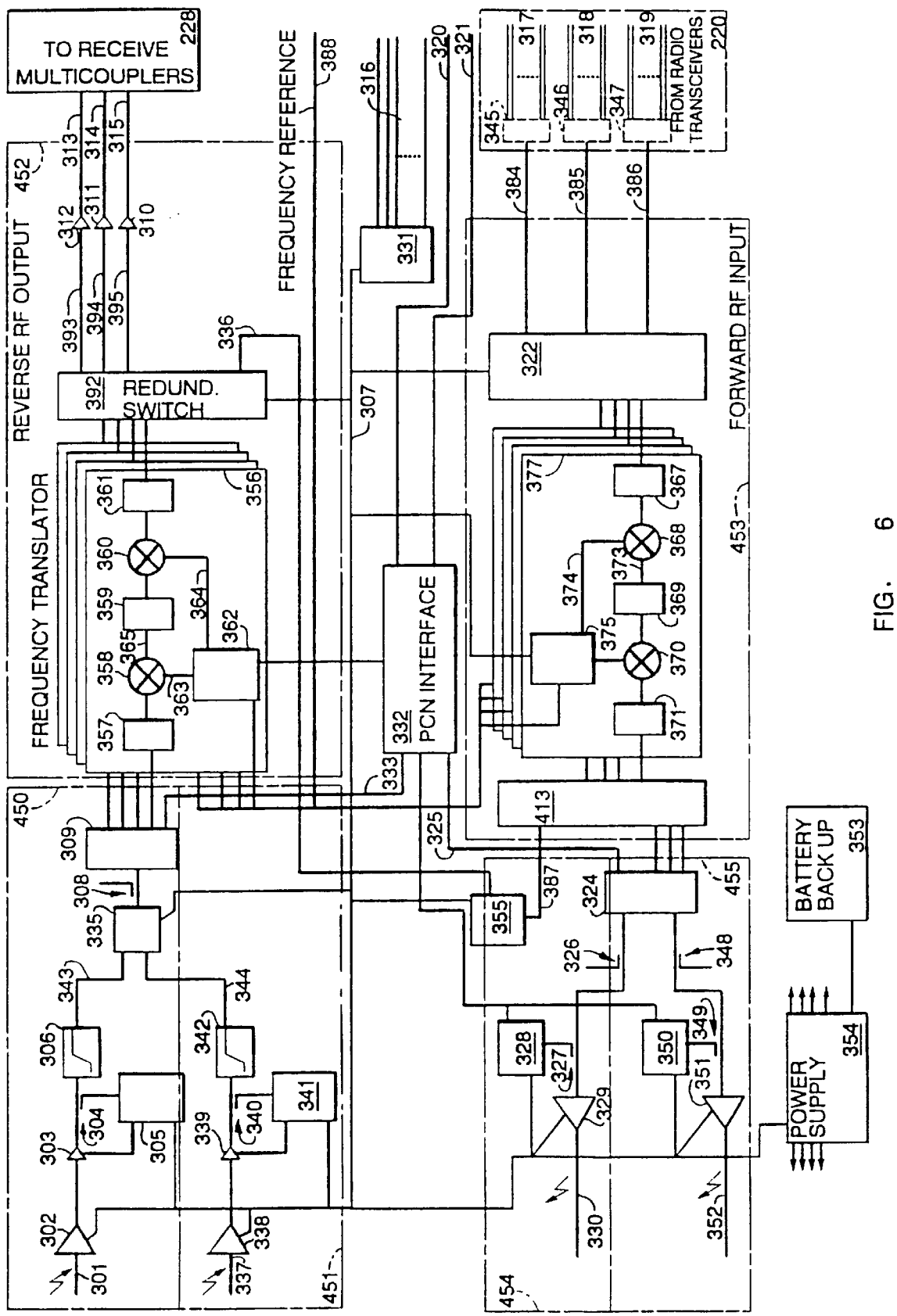
FIG. 6 is a schematic diagram showing a Radio Base Station Microcell Optical Equipment (RBSMOE) which forms an interface between conventional Radio Base Station transceivers in a RBSW or Cell site, and an OCMS.

The optical interface to transmitter 231 and receiver 234 is via an optional fiber patch panel 237, whose functions are described more fully with reference to FIG. 6, which shows the Radio Base Station Microcell optical Equipment (RBSMOE) 236 in more detail. The optical signals are conveyed between the patch panel 237 and to the OCMBS 122 by a fiber cable 232. The optical signals received at the OCMBS 122 are demodulated to recover electrical RF signals which are amplified and radiated by an antenna system 18, as is described further in detail with reference to FIG. 9. Signals received at antenna 18 from wireless radio terminals are similarly conveyed via fiber optic equipment and cable 233 to the RBS. The Optically Connected Microcell System (OCMS) comprises the OCMS together with the RBSMOE and the connecting optical cables 232 and 233.

The transport of analog signals using fiber optic facilities is well documented in the prior art. It is used for example by CATV operators to provide quality signals at low loss to distribution hubs. The optical signals are conveyed from the hub or RBSW site to a distribution or broadcast site. There are several techniques that may be employed to transport these signals over one or several fibres, and the invention is not limited to any particular method. For example, the proper use of Wavelength Division Multiplex (WDM) to reduce fiber counts does not affect the invention. The modulation technique employed is usually either direct amplitude modulation of the optical carrier by the RF signals or preconditioning them by frequency modulation of a carrier which in turn is used to modulate the optical carrier, in order to preserve Signal to Noise performance of the desired signals on the optical system. Optical amplifiers may be used to extend the length of optical links which can be used.

Figure 3:
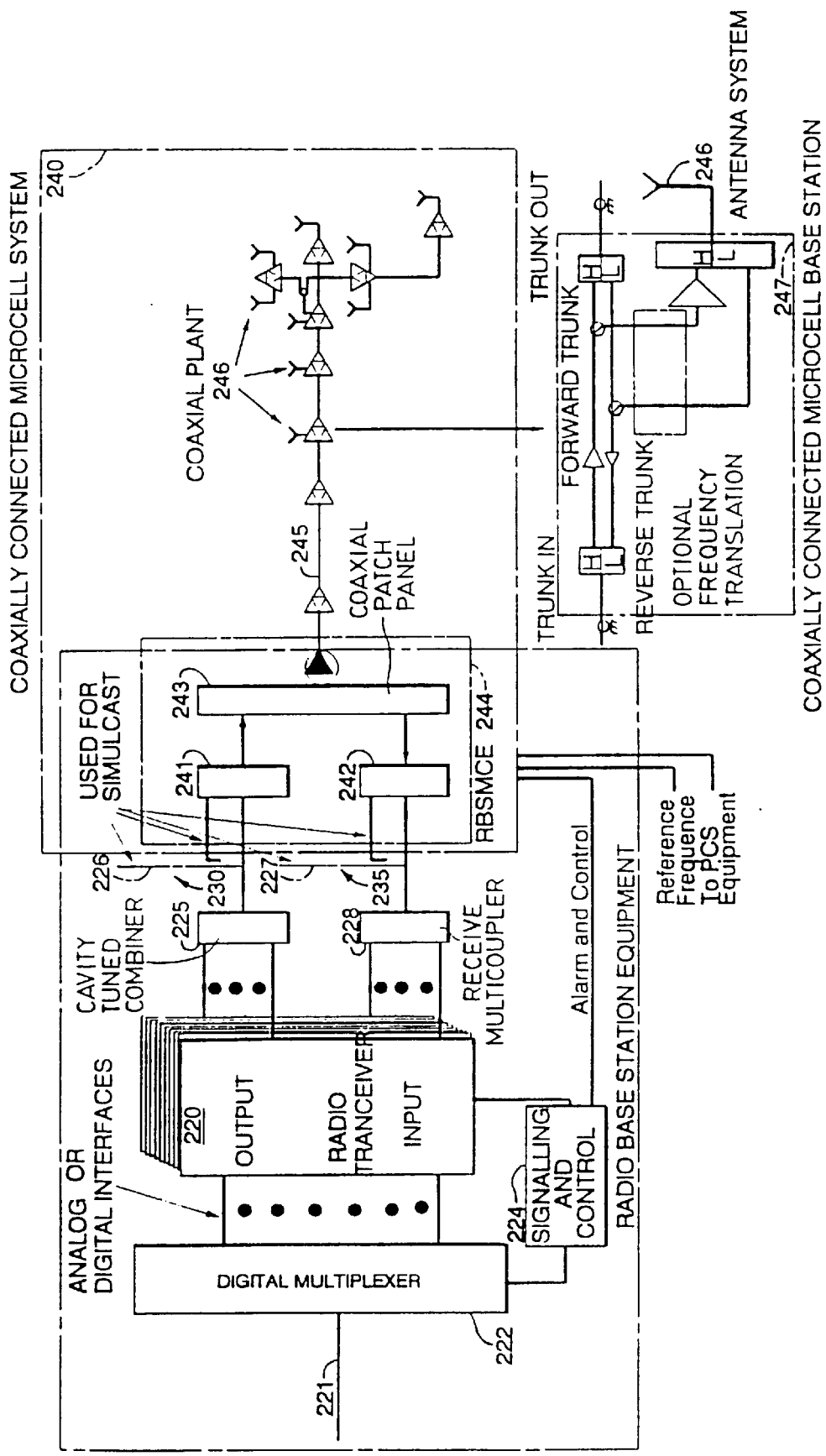
FIG. 3 is a more detailed schematic diagram of a Coaxially Connected Microcell System (CCMS) included in the system of FIG. 1.

FIG. 3 shows a Coaxially Connected Microcell System (CCMS) providing the same functionality as previously described for the OCMS except that transport is by means of coaxial cable. For simulcast operation radio frequencies are sampled off the antenna feed, either at an OCMBS as shown in FIG. 2, or at the RBS as shown in FIG. 3, by directional coupler 230 to Radio Base Station Microcell Cable Equipment (RBSMCE) 244, in which they are applied to an RF translator 241 which changes the radio signals into radio frequency signals that can be accommodated on the coaxial plant 245. In some instances, such translation may not be necessary if the cable has both adequate performance and available bandwidth at the radio frequencies. For dedicated channel operation to provide additional site capacity the output of the cavity tuned combiner 225 is fed directly into the RF translator 241. Conversely the return RF signal is translated to radio frequencies appropriate for mobile communication and applied directly to the receive multicoupler 228. Although this interface includes cavity tuned combiners these are only required when high RF power is output from the radio transceivers to an on-site antenna and the signal is tapped to provide simulcast operation. Direct interconnection to the coaxial system can in other circumstances be made through available low-power combiners.

The interface between the RBSMCE 244 and a coaxial cable 245 may be via an optional RF patch panel 243. The translated RF signals from the patch panel are carried by a coaxial cable 245 to a Coaxially Connected Microcell Base Station (CCMBS) 247, where the translated signals are converted back to the frequencies used in the Radio Telephone Network, amplified, and radiated by an antenna system 246. Signals received at antenna 246 are similarly translated for transport on the coaxial cable 245 to the RBSMCE 244. A Coaxially Connected Microcell System (CCMS) 240 comprises a RBSMCE 244, at least one segment of coaxial cable 245, and one or more CCMBS 247, with RF translation preformed both by the RBSMCE 244 and by the CCMS 240, providing an effectively loss-free transmission system from the RBS site to the CCMBS site. The CCMS also includes the capability of providing PSC/PCN services as described later.

Typically, the coaxial cable connection 245 utilized forms part of a CATV system. The bi directional transport of signals on two-way coaxial cable CATV facilities is well documented in the prior art. Conventionally, the conveyance is at radio frequencies greater than 50 MHz from an originating location (headend) or relay points (hub), downstream to residences and businesses: upstream conveyance is at frequencies in the range 5 to 30 MHz from residences and businesses to the hub or headend. The signals are conveyed to and from homes, businesses and public areas via single coaxial cable drops which are connected to coaxial feeder lines by two way signal couplers. The feeder lines may be in turn connected to a coaxial trunk line or optical cable link 209 connected to an RBS Warehouse 208 or conventional RBS site 207 forming a classical "tree-and-branch" configuration as used in CATV systems for the distribution of signals, primarily TV program signals from one or more hubs or headends, to a multitude of subscribers. Normal bi directional coaxial cable systems use high and low pass filters to separate forward and reverse signal flows on a single cable. Some cable operators install dual cable networks in which the signal flows are segregated, in order to increase the capacity of their system. Feeder cables and bridges connected to the trunk provide branches to feed local subscribers.

In general, the RF frequencies allocated for mobile telephony, data, paging, or PCS/PCN cannot be satisfactorily conveyed on coaxial cable facilities, and thus a principal function of a CCMBS is to translate the radio frequencies used for these services to frequencies suitable for coaxial cable transmission. More specifically, signals intended to be delivered to a mobile user are typically conveyed in a frequency band above 50 MHz and translated by a CCMBS in the vicinity of a mobile user to a frequency in the receive frequency band of the mobile set. Signals transmitted by the mobile set are in turn received by the CCMBS and translated to a frequency typically in the range 5 to 30 MHz for conveyance by the coaxial cable system to an RBS Warehouse or conventional RBS serving that mobile set. The frequency bands used for forward and reverse paths are at the discretion of the service operator controlling the cable facilities. The above mentioned frequency allocation for upstream and downstream signals is referred to as sub-split; other allocations may be utilized such as mid-split (using 110–174 MHz as a transition zone between upstream and downstream signals) and high split. Availability of a dual cable plant allows forward and reverse transmission on independent cables.

Although frequency translation for coaxial transmission is usually needed, transmission is possible over low loss heliaxial cable at actual RF frequencies used in Radio Telephone Networks. Heliaxial cable is usually very expensive and quite bulky compared to coaxial cable suitable for operating at lower frequencies, but may be a viable option in some short distance applications.

Figure 8:
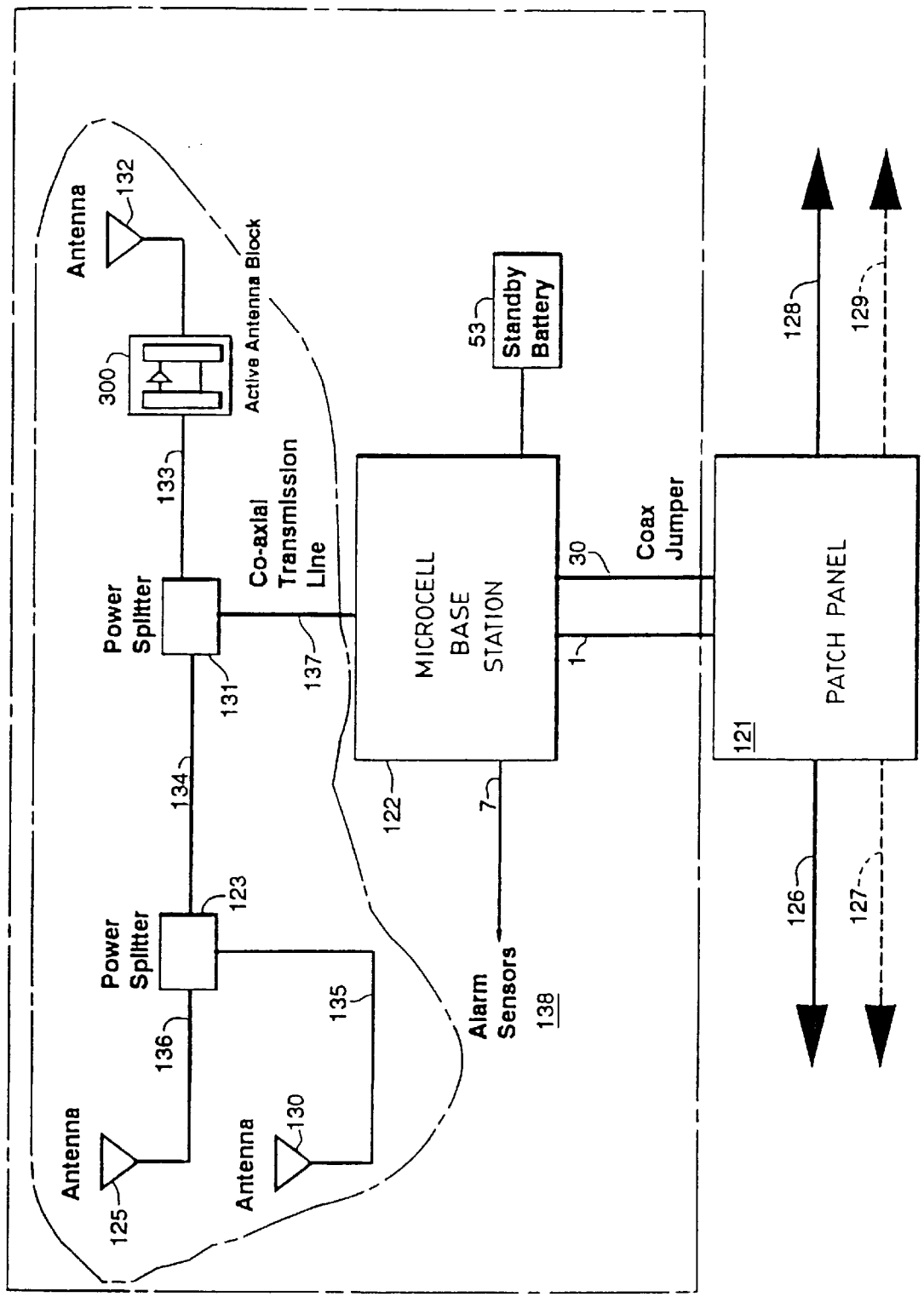
FIG. 8 is a schematic diagram showing a distributed antenna system associated with an OCMBS or CCMBS.

A generic Microcell Base Station (MBS) which may be an optically connected station (OCMBS) 210, or a coaxially connected station (CCMBS) 247 is described in more detail with reference to FIG. 8. As discussed in FIG. 2 optical signals are transported on cables 126, 127 which may be optical fibres 232 or coaxial cables 245, and which may be terminated at the MBS site at a patch panel 121. Optional path redundancy may be provided by additional cables as discussed further below. Optical or coaxial patch cables at the patch panel direct the signals from cables 126 and 127 to similar type cables 1 and 30. Redundant patch cords may be provided by cables 37 and 52. The MBS proper 122 translates electrical signals received on mobile radio frequencies from a transmission line 137 to modulated optical energy or frequency translated signals on cable 30 and translates signals on cable 1 to radio signals which are amplified and applied to the transmission line 137. The transmission line 137 is in turn connected to an antenna system comprising antennas 125, 130 and 132 connected by power splitters 131 (See FIG. 10) and 123, cables 133, 134, 135 and 136, and possibly active antenna blocks 300 (See FIG. 9).

This antenna system is termed a distributed antenna system, since coaxial or heliaxial cable is used to feed a plurality of antennas distributed within a coverage area. The use of multiple antennas effectively increases and controls the size of the coverage area. The use of distributed antennas is not in itself a requirement of the OCMBS, but the dynamic range of presently available optical or coaxial cable based transmission systems imposes limitation on the overall coverage area which are not applicable to existing radio equipment with a co-sited antenna. Present mobile systems offer about 50 dB of dynamic range within the signal bandwidth of the radio signal, whilst the transceiver units themselves operate with a typical dynamic range of 70 dB. With advances in optical and coaxial transmission technology increased dynamic range of these systems may be expected which will meet or better that of existing radio equipment. Such advances include the use of optical isolators, optical amplifiers, DFB lasers, and Feed Forward (FF) amplifiers. To provide effective coverage of the same area as a conventional radio base station with lower power and in a controlled RF environment will usually at present required use of spatially distributed antenna systems.

Such spatially distributed antenna systems could also form part of a Coaxially Connected Microcell System (CCMS) as the output of an OCMBS 238 could be transported over a low cost coaxial distribution network 240 to a multiplicity of antennas as depicted in FIG. 2 to provide a controlled, uniform, low power radio coverage.

Figure 4:
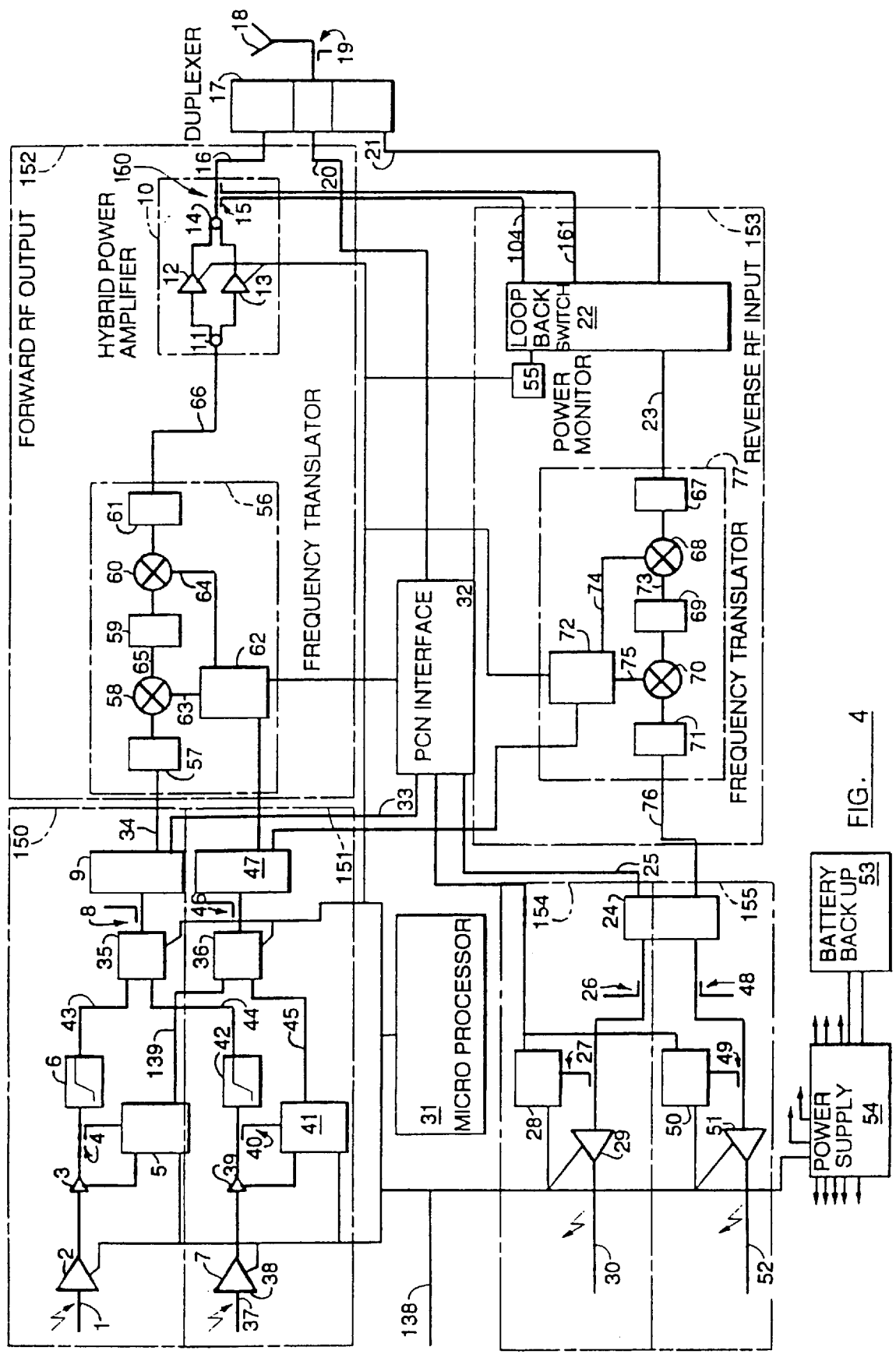
FIG. 4 is a schematic diagram of an Optically Connected Microcell Base Station (OCMBS) incorporated in the OCMS of FIG. 2.

Referring to FIG. 4, an Optically Connected Microcell Base Station (OCMBS) 238 will now be described in more detail. Such a station should be designed for high reliability, it being understood that a major objective of the invention is to provide individual radio telephony access sites or virtual base stations within a service area which need minimal service and maintenance.

Radiotelephone signals from the base station equipment of an RBS site or RBS Warehouse, and intended for a mobile 206, are passed at the OCMBS from the optional fiber patch panel 121 (see FIG. 2) in this case by a fibre patch cable 1 to a forward receiver subsystem 150. This acts to recover the modulation from the low power optical signals on the fiber cable 1, and convert it to electrical signals that can be delivered to a Forward RF Output (FRFO) subsystem 152. The FRFO subsystem amplifies the signals to an appropriate level for delivery to the antenna system 18 via a duplexer 17.

Within the subsystem 150, the input optical connection by fiber cable 1 from the Optical Fiber Patch Panel 121 is connected to the input of an optical receiver 2, which recovers the signals which were used to modulate the optical signal by the RBSMOE 236 prior to its transportation by fiber optic cable 232. The light signal may be modulated typically at frequencies in the range of 10 to 1000 MHz. The precise frequency band utilized may be selected to suit the bandwidth available within the optical plant represented by the cable 232, since frequency translators associated with the modulators and demodulators allow the frequency spectrum conveyed to be selected to accommodate present and future developments in optical technology and traffic on the optical plant. The signals recovered by receiver 2 are applied to an Automatic Gain Control (AGC) amplifier 3 to provide nominal output levels independent of the transportation path length and attenuation. Embedded within the received frequency spectrum is a pilot carrier. This pilot carrier is sampled by directional coupler 4 and is detected by a pilot detector 5. The detected pilot carrier serves several purposes. It provides a reference level for the AGC amplifier 3 to ensure optimum output level. It provides a carrier for a data channel providing for remote communication of supervisory signals from the RBSMOE 236, and it provides a frequency reference, for frequency translations such as those already described and to be described. The output of the AGC amplifier 3 is filtered by a filter 6 to remove the pilot carrier and prevent its possible radiation by the antenna system 18 as an unlawful or unwanted emission. The output of the filter 6 is monitored by a directional coupler test point 8 and applied to a splitter 9 to divert portions of the receiver output over lines 34 and 33 to the FRFO 152 and to a PCN interface 32. The FRFO subsystem 152 provides the necessary amplification required to provide RF coverage from the antenna 18 at the OCMBS location. The AGC amplifier 3 ensures that the radiated power of the OCMBS remains constant.

Within the FRFO subsystem 152, a frequency translator 56 is provided if required to translate the received frequency spectrum to the assigned radio frequency band to be radiated.

Frequency translation will generally be required where an optical link is to be shared with other communications, where it is not practical or economic to modulate the optical signal directly at the frequencies allocated for the radiotelephony signals to be transported, where the signals are to be transported by a hybrid coaxial and optical cable system, or where it is convenient to utilize similar frequencies for transportation of signals on both types of cable.

Low power signals on conductor 34 are changed from frequencies such as those reserved for coaxial cable systems, usually in the range of 50 to 550 MHz, to high power radio frequencies used by the mobile radiotelephony system, usually 800 to 1000 MHz, by a frequency translator 56 preceding a Hybrid Power Amplifier (HPA) 10. The frequency band to be translated is typically 11 to 23 MHz wide. Within the frequency translator subsystem 56, the low level signals from conductor 34 are selected by a band pass filter 57 from the available input spectrum. This frequency block is applied to mixer 58, which is driven by an output from a voltage controlled oscillator unit with a frequency chosen to heterodyne the selected signals to an intermediate frequency, typically but not limited to a nominal 45 or 70 MHz, in a known manner. The output of the mixer 58 is again band limited by a filter 59 providing rejection of image and spurious mixer signals from mixer 58. It is then applied to mixer 60, driven by a separate output from the voltage controlled oscillator unit 62 on conductor 64. A second heterodyne conversion occurs in mixer 60 which translates the intermediate frequency to the correct Mobile Radio Telephony operating frequency band. A filter 61 removes undesired spurious mixer byproducts from the signal presented to the hybrid power amplifier 10 used to deliver the desired output to the antenna 18. The outputs from the voltage controlled oscillator unit 62 are frequency synthesized and thus coherent. They are referenced to signals derived from the pilot carrier available on conductor 47.

Also within the subsystem 152, the HPA 10 is used to provide the necessary gain and RF power required. Signals on conductor 34 are split by splitter 11 and applied to two linear power amplifiers (PA) 12, 13. The outputs of PA 12 and PA 13 are combined by a combiner 14. This arrangement provides for a measure of redundancy in that if PA 12 or 13 were to fail, operation of the site is still assured but with a slight loss of output power. Each PA is separately powered from a power supply 54 to ensure that a fault in one PA does not affect the other, ensuring that at least one PA is operational. A sample of the combined output is directed via a directional coupler 15 and a line 104 to a loop back switch 22. The output of the directional coupler 15 is attenuated by tap loss to within 10 dB of the maximum received signal appearing on an input conductor 21. A further directional coupler 160 provides access for measurement of the reflected power from the HPA 10 to determine the operational characteristic of the OCMBS.

The output of FRFO subsystem 152 on conductor 16 is applied to a duplexer 17 which provides transmitter output shaping and frequency isolation between transmit and receive portions of the OCMBS for radio telephone network signals. The duplexer 17 also has an additional port to allow Personal Communication Services (PCS) type signals on a conductor 20 to be applied to the same antenna 18. Additional transmit and receive test ports are provided by a directional coupler 19.

Radio telephone signals from the mobile transceiver 206 destined for the radio transceivers 220 at the RBS 207 (see FIG. 2) are received by the antenna system 18 of the OCMBS 122 and are returned along a reverse path to the RBSMOE 236, to the radio transceivers 220, and alternately to the MTSO 200 (FIG. 1) for routing to the appropriate end user. Received signals entering the antenna system 18 are electrically frequency separated by the duplexer 17, with radio telephone network signals being routed by conductor 21 to the Reverse RF Input (RRFI) subsystem 153 which provides conditioning and measurement of the signals prior to their being applied to a reverse optical transmit subsystem 154.

In the subsystem 153, signals from conductor 21 are applied to a loop back switch 22. A loop back switch is incorporated in the OCMBS to allow maintenance personnel to perform remote routine diagnostics and measurements, and to provide forward RF output subsystem fault detection. Routine diagnostics can be performed by injecting a RF carrier at the RBSW or RBS by program control of the transceiver units, or by test equipment capable of injecting an RF carrier into the optical transmitter 231 at a predetermined level. With proper commands conveyed to the OCMBS by the pilot carrier, a control micro processor 31 causes the loop back switch to select either the forward or reverse power for RF measurement by a power monitor 55, or loops the transmitted signal back to the RBSW or RBS for measurement. The forward power measurement as determined by the power monitor can be performed on live traffic or test traffic generated by maintenance personnel. This test determines whether the output power generated by the HPA 10 is within the parameters established for the chosen cell site. The reverse power measurement can also be performed on live or test traffic. This measurement determines whether the electrical path from the HPA 10 through the antenna system has been degraded by vandalism, deterioration or accidental destruction of the cable or antenna system at the cell site, which would result in substandard service. The power monitor 55 generates a digital code representing the detected power that it sees directed to it by the loop back switch. This digital code is passed to the micro-processor 31 for evaluation and is transmitted back to the RBSW or RBS for evaluation by maintenance personnel. The injection of a test carrier and looping it back allows maintenance personnel to perform end to end measurement of the system. By adjusting the level and frequency of the test carrier, signal to noise ratios can be calculated, overload points established, and system frequency response evaluated. This data can be used to verify degradation of service coverage or the onset of equipment fatigue or failure.

The loop back switch 22 also receives a sample of transmitted signal from the HPA subsystem on conductor 104, whilst the signal on conductor 161 is used to measure the reflected power as seen by the HPA subsystem 10. The loop back switch may be controlled to apply one of these inputs to the Power Monitor (PM) 55 and/or to conductor 23 in place of the radiotelephony signals received on line 21 from the antenna 18. The power monitor will measure the composite power generated or received by the OCMBS. The output of the loop back switch on conductor 23 is applied to the reverse optical transmit subsystem 154 on line 76 after frequency translation, if required, by a frequency translator 77.

Thus signals from the loop-back switch 22 on conductor 23 are frequency translated to a frequency block which may be compatible with conventional CATV coaxial cable facilities, or within the same broad frequency band as that employed for the transmit subsystem, typically within the 50 to 500 MHz band. The service operator may select frequency bands for the forward and reverse path depending upon the architecture of the network. Frequency translated signals from the subsystem 77 are forwarded to the primary and secondary reverse optical transmit subsystems 154, 155.

The subsystem 77 receives signals on conductor 23 from the loop back switch in the range of 800 to 1000 MHz. This signal is band limited by a filter 67 prior to heterodyning by mixer 68, using a local oscillator signal 74 from a VCO control block 72 which translates the band limited spectrum from filter 67 to an intermediate frequency block as described above. The intermediate frequency signals are filtered to remove image and spurious mixer products, and again heterodyned with a separate local oscillator signal 75 from block 72 in a mixer 70 to provide signals in an allocated frequency block on conductor 76, which signals have been band limited and had spurious signals removed by a filter 71. The output band can, as stated earlier, be any frequency group within the capacity of the optical system, as defined by the operator of the particular system. The VCO control block is controlled by the pilot carriers from conductor 47, to assure coherent operation and translation, with zero frequency offsets or errors between input and output. This is extremely important when sample signals from the power amplifiers 15 are to be looped to loop-back switch 23. With coherent operation and synchronization, the translation through subsystems 56 and 77 at the OCMBS, and through analogous translators at the RBSW or RBS, will not result in any frequency error or offset.

Both the frequency translation subsystems 56 and 77 are connected to the microprocessor bus 7, allowing the microprocessor to program the frequency of the VCO units 62 and 72 and detect faults in frequency generation. This ability to select various different frequency blocks through the VCO's permits multiplexing required to transport multiple sectored frequency groups.

To permit multiple frequency groups on the fiber, the filters 57 and 71 should be tune able over the desired spectrum of operation to minimize co-channel signals in a densely occupied transmission medium from reaching the output. It also reduces the demands on the filters 59 and 69 and reduces the composite signal seen by the mixer. If the filter is not present, more signals reach the mixer. This requires reduction of input levels to avoid intermodulation, in turn requiring tighter specification of the filter following the mixer. A standard TV tuning section meets the requirements described.

The subsystem 155 conditions radio telephone signals received from subsystem 153 together with any PCS signals received from the PCN interface 32, and adds a pilot carrier, the combined signals then being converted to optical information destined for the same RBSMOE from which the OCMBS receives optical signals. The design of the entire OCMS is such that an apparently loss-free transport facility is seen by the RBS equipment, enabling the RBS and the MTSO to perform transparently all tasks normally associated with a radiotelephony network.

Signals on conductor 76 are combined at a combiner 24 with PCS signals from PCN interface 32 via a conductor 25. A directional coupler 27 inserts into the output of combiner 24 a return pilot and data carrier. The combined signal is then utilized to modulate an optical carrier in optical transmitter 29. The output of the optical transmitter is transferred by the patch cable 30 to the optional patch panel 121 and then to the RBS or RBSW via cable 127 or 129.

The power supply unit 54 converts available AC or DC input power for distribution to the various subassemblies. For reliability, each subassembly is individually fused, and a battery back up system 53 is also coupled to the power supply to receive charging current, and in the event of primary power failure, to provide continuity of operation. This battery system can be internally or externally mounted. If the operator desires to keep only the optical and alarm systems operating during a power outage, then small NiCad batteries will suffice to maintain a communication link with the OCMBS for use by operational and maintenance personnel but not to allow radio communications. This strategy reduces the overall weight and size of the proposed system. The power required to operate the power amplifiers 10 during a primary power outage would require the capacity found in lead acid batteries. If the operator required full operation during an outage then high capacity acid batteries would be needed, typically mounted external to the equipment.

The subsystems 2,5,10,22,55,32,28,29,54,62 and 72 are all connected to the bus of a microprocessor 31. This microprocessor records and monitors alarm conditions from components 2, 29, 10, 138, decodes and responds to incoming requests from the RBS or RBSW recorded by the data receiver 5, and relays information and alarm conditions gathered at the OCMBS over the reverse data circuits 28 to the RBS or RBSW. It also controls the loop back switch as requested, monitors the output of the power monitor 55, and monitors power supply functions and battery charging.

In order to provide a greater degree of redundancy in the optical subsystems, duplicate optical receive and transmit sections 151 and 155 may be provided. Such redundancy may be required if high reliability RF coverage is required or when a large number of RF carriers are transported to the OCMBS. The redundant optical paths to and from the OCMBS can be formed into a ring configuration interconnecting many such optically connected microcell base stations to a Radio Base Station Warehouse.

In this case radio telephony signals from the base station equipment in the RBS site or RBSW and intended for mobile transceiver 206 are passed from the fiber patch panel 121 to both the primary and secondary forward optical receiver subsystems 150 and 151. The subsystem 151 operates similarly to the subsystem 150 already described, the components 37–42 being analogous to the components 1–6 of subsystem 150. The outputs of only one subsystem are selected rather than simply combining the outputs since the different path lengths over the primary and secondary optical links to the waveguides 1 and 37 may introduce different time delays that are potentially harmful, particularly for frequency references required by PCS communications. A longer transmission path in the secondary link also degrades the signal to noise performance of the secondary link which would reduce the overall dynamic range of the OCMS if the signals were combined.

Accordingly, the outputs of filters 6 and 42 are applied to a first RF switch 35 on cables 43 and 42, and the outputs of pilot detectors and data receivers 5 and 41 are applied by cables 139 and 45 to a second RF switch 36. The RF switch 35 is under control of the microprocessor 31 which will select either the primary or secondary signals either autonomously or responsive to a command from the RBS or RBSW. In the event of microprocessor failure, as signalled for example by a watchdog timeout, the switch will remain latched in its existing condition. The output of RF switch 35 is then processed similarly to the output of filter 6 in FIG. 4. The RF switch 36 operates in parallel with switch 35 to ensure that the group delay associated with the received spectrum is minimal and that proper conversions and synchronization can occur within the various entities, the output of this switch being routed as described for the output of receiver 5.

In the reverse optical transmitters 154 and 155, both receive inputs from a common combiner 24, but otherwise components 48 to 52 duplicate the functions of the components 25–30 as already described. No RF switching is required between the transmitters at the OCMBS, since signal selection will be performed at the RBS or RBSW.

Figure 5:
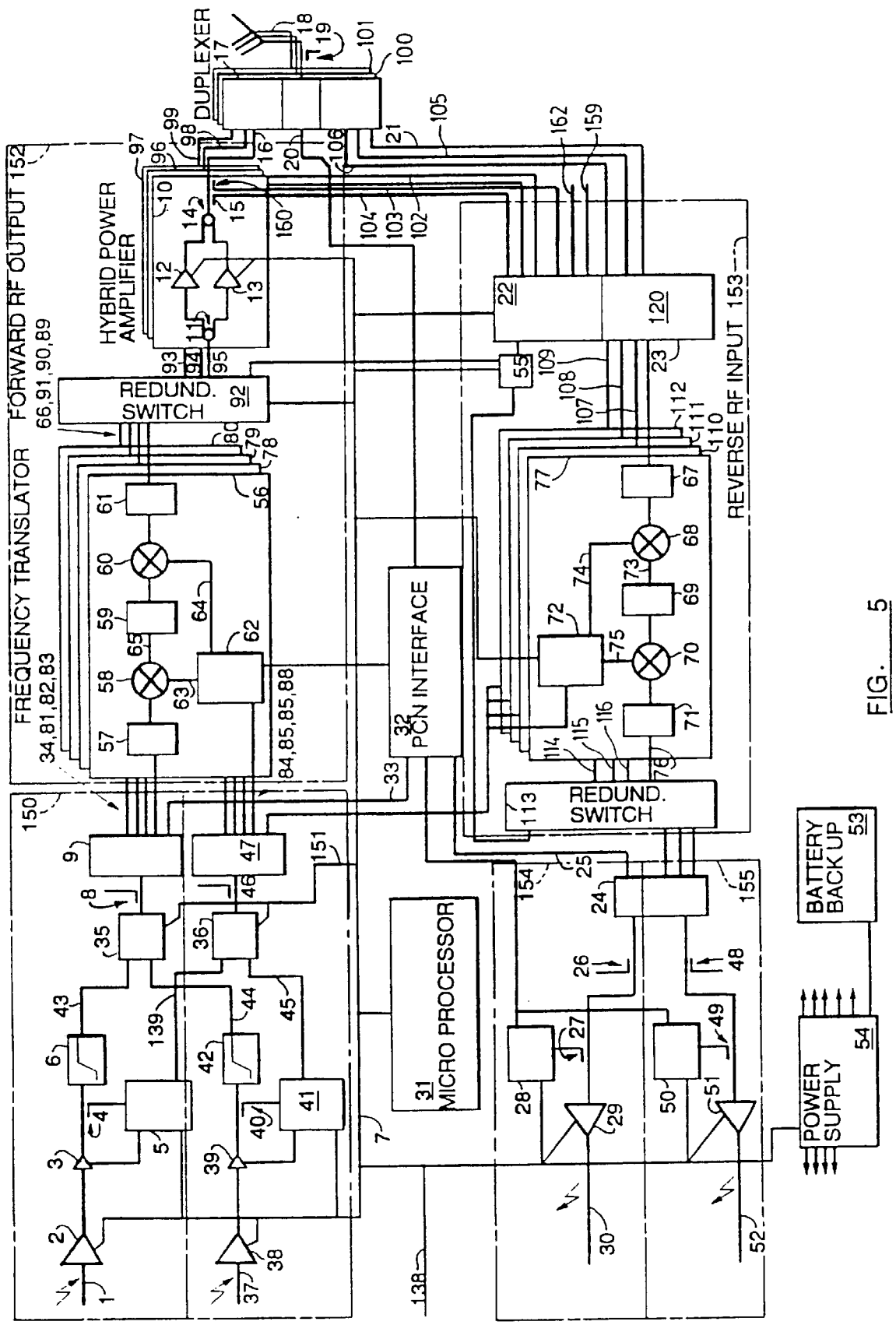
FIG. 5 is a schematic diagram of an OCMBS incorporating multiple frequency translators and antennas.

Referring to FIG. 5, multiple frequency translation subsystems, with redundancy, may be employed. The addition of several frequency translators to the embodiment shown in FIG. 4 will allow multiple groups of mobile radio telephony frequencies to be coupled to individual antennas providing distinct services and areas of coverage. Each group or block of frequencies which has been multiplexed onto the optical transmission media is separately converted, amplified and directed to the intended antenna system.

In FIG. 5, the splitter 9 acts to provide isolation between multiple translators 56, 78, 79, 80 so that mixing signals from one translator which pass backwardly through filter 57 are severely attenuated at other ports of the splitter 9. Four translators are provided in the example shown, although a different and possibly considerably greater number could be utilized as required. The microprocessor bus 7 permits remote programming of each translator to a specific group of frequencies, the number of translators being greater, in this case by one, than the number of groups of frequencies to be serviced, the redundant translator being used upon detection of failure of an operational unit. The frequency translators 56, 78, 79, 80 provide mobile radio telephony outputs as previously described, their outputs 66, 91, 90, 89 being applied to a redundancy switch 92. The redundancy switch under control of the microprocessor 31 via bus 7 performs appropriate switching to direct translated frequency blocks to an appropriate amplifier 10, 96 or 97. Sampled outputs of the amplifiers are fed to loop-back switch 22 on conductors 102, 103, 104 and each amplifier is monitored by power monitor 55 as previously described. The power monitor 55 will indicate to the microprocessor whether the subsystem for a particular antenna is operational and thus whether a redundant translator should be switched in by switch 92. The outputs 93, 94, 95 or the outputs 81, 82, 83 could be routed to coaxial feeds for further distribution, as discussed elsewhere in this specification.

Received signals from the antennas are directed through the appropriate one of three duplexers 17, 101, 100 to the loop-back switch 120 via conductors 21, 105 and 106. A redundancy switching function in switch 120 applies signals from these lines or the sampled outputs of the amplifiers to three of translators 77, 110 and 111, and 112. In the example considered, translator 112 is designated as a redundant, standby translator, receiving a signal for any one of conductors 21, 102, 103, 104, 105 or 106 under control of the microprocessor 31.

The three primary translators 77, 110 and 111 translate the frequencies of the signals received from switch 120, whilst back-up translator 112 processes signals as directed by 31. The out-put signals from the primary and back-up translators are applied to an additional redundancy switch 113. This switch, under control of microprocessor 31, selects the processed signals to be combined in 24. The redundancy switch 113 also provides a test port which can copy the processed signals from each translator and apply them to the power monitor 55 for measurement and fault detection.

The RBSW carries out the reverse process to that described above. Referring now to FIG. 6, the Radio Base Station Microcell Optical Equipment (RBSMOE) is shown in more detail. FIG. 6 shows a fully redundant configuration that may be used to interface to the FIG. 7 embodiment of the OCMBS.

The OCMBS and the RBSMOE are largely identical with the exception that there is no need to recover a reference frequency or to be able to switch it as this reference is available from the RBSW or RBS on line 388. Thus similar reference numerals, with the addition of 300 are used to designate corresponding ports to those shown and described in FIGS. 4 and 5. The signal outputs from the redundancy switch 392 are applied to post amplifiers 310, 311, 312 to compensate any loss not elsewhere compensated and then to the radio base station equipment at the RBSW, usually through a multicoupler 228 used to interface the many radio transceivers connected to the OCMBS or CCMBS.

The outputs from the radio transceivers 220 in the RBSW can be connected to low power, wide band combiners 345, 346, 347 if their outputs are low power. When standard radio equipment is used the typical output power is tens of watts, and is combined using conventional methods such as tuned cavity ports whose output can be attenuated to the proper levels for injection into the optical system. A PCN interface 332 provides separate receive and transmit ports for further external interface equipment.

Radiotelephony signals from the base station equipment in the RBS site location or RBSW and intended for the portable 206, are passed from radio transceivers 220 to the Forward RF Input subsystem 453 which provides signal conditioning.

The use of frequency translation allows for the handling of multiple services by the same transport system. Multiple antennas can be served by one transport facility through frequency translation into distinct frequency spectrum allocations. It is vitally important in cellular systems employing sector antenna arrangements to be able to identify which signals are received on one particular antenna. The cellular architecture requires this one to one correspondence between sectored antennas and cellular base station receiver equipment; direct coupling of these signals at the cellular frequencies is not permitted. The ability to multiplex these translated frequency groups over a single transmission path and to demultiplex them at a destination meets this one to one correspondence requirement, and provides for a virtually transparent medium enabling the OCMBS to provide one or more virtual base stations at a considerable distance from the RBSW.

Multiple antenna sectors combined at the RBS site are fed to the Forward RF Input subsystem 453. Low power signals from the redundancy switch 322 are frequency translated to be compatible with conventional CATV facilities. In view of the large bandwidth of a fiber transport system the same frequency band as that chosen for the receive subsystem can be employed for the transmit subsystem, specifically the 50 to 500 MHz band, or the service operator may choose different frequency bands for the forward and reverse paths depending upon the architecture of the network. Frequency translated signals from subsystem 377 are forwarded to the primary and secondary forward optical transmit subsystems 454, 455. These subsystems 454, 455 condition the radio telephony signals together with any PCS signals and add a pilot carrier, the combined signal then being converted to optical information destined for the OCMBS. The design of the OCMS is such that an apparently loss free link is seen by the RBS equipment, enabling the RBS and the MTSO to perform transparently all tasks normally associated with a radio telephony network.

Signals received from the transceivers 220 via multiple conductors 317, 318, 319 are directed through an appropriate combiner, either supplied by the service operator or built into the RBSMOE at 345, 346, 347 and are applied to the redundancy switch 322 via conductors 384, 385, 386. The redundancy switch 322 switches a copy of the data on one of these lines to the redundant translator. For the purposes of description, subsystem 412 is designated as the redundant translator. Conductor 407 can carry data from any of conductors 384, 386, 385 under control of the microprocessor 331.

The outputs of the redundancy switch are directed to the appropriate translator on conductors 376, 414, 415, 416. The three primary translators 377, 410, and 411 heterodyne the signals provided by 323. The back-up translator 412 processes signals as directed by microprocessor 331. The heterodyned signals from the primary and secondary translators are supplied to an additional redundancy switch 413. This switch under direction from the microprocessor 331 selects the processed signals to be combined in combiner 324. Redundancy switch 413 also provides a test port which can copy the processed signals from each translator and apply them to a monitoring unit 355 for measurement and fault detection.

The translators 377, 410, 411 and 412 operate similarly to translators 77, 110, 111 and 112, but receive signals from the redundancy switch in the range of 800 to 1000 MHz. The output band of the translators can be, as stated earlier, any frequency group within the capabilities of the optical system as defined by the operator for the particular system. The VCO control blocks are also referenced to the frequency reference 388, and thus coherent operation and translation, preventing frequency offsets or errors between input and output, are assured.

The frequency translation subsystems 377, 410, 411, and 412 are accessed by the microprocessor bus 307. This bus allows the microprocessor to program the frequency of the VCOs and monitors any detected faults in the frequency generation. This ability to select various frequency blocks by the VCOs allows the multiplexing required to transport multiple sectored cellular groups and various radio telephony services, as discussed.

On the forward primary and secondary optical transmit subsystems 454, 455, radio signals are converted to optical information. The signals from conductors 417, 418, 419 are combined with those from the PCN interface on conductor 325 and then split by combiner and splitter 324 to provide the same information to both primary and secondary optical converters. PCN/OCS signals that are destined to be transported to the OCMBS are received by the interface 322 from the RBSW on conductor 321 in a FDD or TDD format in which the transmit and receive portions have been separated by external equipment. The signals on conductor 321 are translated by the interface 332 to a suitable frequency band for modulation onto the optical carrier.

The combined information signals also include pilot and data carrier signals destined for the OCMBS, inserted into the output of the splitter 324 via directional coupler 327. This combined signal is converted from high frequency electrical energy to optical energy by an optical converter 329. The output of the optical converter is fed to the optional patch panel 237 by a patch cable 330 and then to the OCMBS on optical cable 232. Secondary pilot and data circuits 350 provide duplicate signals inserted into the secondary path through subsystem 455. Microprocessor 331 provides the data required for the RBSW on bus 307 to both the primary and secondary pilot and data generators 328 and 350. Both pilot circuits receive a frequency reference from line 388 thus providing end to end synchronization.

Radiotelephony signals from the mobile radio unit 206 intended for the radio transceivers 220 at the RBS, 207 are received by the antenna system 18 at the OCMBS and are returned on the reverse path through the RBSMOE to the radio transceivers and finally to the MTSO for routing to the appropriate end user.

Signals received from the optical fiber transportation system on primary and secondary patch cable connections 301 and 337 are applied to the primary and secondary reverse optical receiver subsystems 450, 451. These subsystems act to process low power optical signals from cables 301 and 337 to recover their RF modulation for delivery to the Reverse RF Output (RRFO) subsystem 452. The RRFO subsystem frequency translates the radio telephony signals and conditions them to the appropriate levels required at the Radio Base station site for delivery to the receive multicoupler systems 228 via conductors 313, 314, 315. Only one receive signal path is chosen from the redundant optical subsystem 450 and 451 rather than simply combining the two received signals that are forwarded to the RRFO subsystem. Different path lengths in the fiber plant for the primary and secondary links produce differential time delays that are potentially harmful to maintaining frequency and phase references required by PCN/PCS communications and the frequency translation subsystems. The additional path would also degrade the signal to noise performance of the transportation system reducing the overall dynamic range of the OCMS.

The operation of the subsystems 450 and 451 is analogous to that of subsystems 150 and 151 previously described with reference to FIG. 4 except that a frequency reference is not recovered by the pilot detectors and data receivers 305 and 341, this reference being provided instead by line 388.

Figure 7:
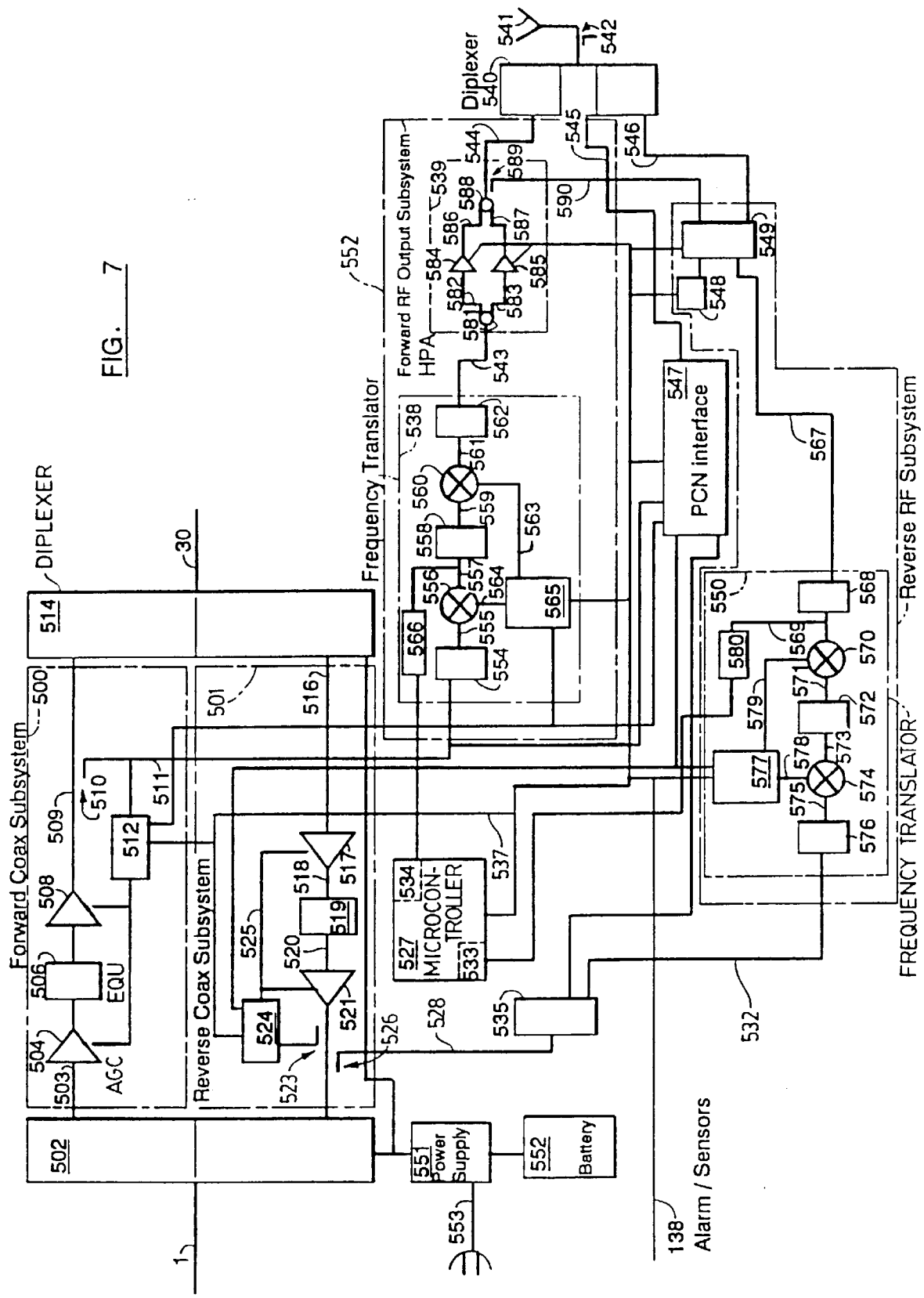
FIG. 7 is a schematic diagram of a Cable Connected Microcell Base Station (CCMBS)

Considering now the construction of an exemplary CCMBS, radio telephone signals from the base station equipment in the RBS site or warehouse, and intended for mobile 206, are passed from an optional patch panel 121, via the coaxial transportation system as described with reference to FIG. 7, entering the forward received coaxial subsystem 500. This subsystem acts to amplify and condition low power signals from the coaxial transport to signals that can be delivered to a Forward RF Output (FRFO) subsystem 552. The FRFO subsystem acts to change low power signals received from the forward coaxial subsystem, usually at frequencies reserved for CATV, and typically in the range of 50 to 550 MHz, to frequencies used by the radio telephone network, usually in the range 800 to 1000 MHz, at high power for broadcast by an antenna 541 through a duplexer 540 and thence to a mobile 206. Reverse signals from the mobile pass from the antenna through the duplexer to a Reverse RF Subsystem 553.

The coaxial patch cable 1 from the patch panel 121 is connected to a duplexing filter 502 by means of which frequencies in the range of 5 to 30 MHz present on the output of amplifier 521 may be inserted onto the cable 1 with minimum attenuation, whilst signals above 50 MHz pass through the duplexing filter from the cable 1 to the conductor 503 from which they are available to the subsystem 500. These frequency bands are exemplary only and may be changed to suit the coaxial transportation system.

In the subsystem 500, the signals on line 503 are conditioned by an automatic gain control amplifier 504 and an automatic slope control amplifier 508 to provide nominal output levels independent of the length and attenuation of the coaxial transportation system. The AGC and ASC amplifiers 504 and 508 ensure normalized RF spectrum signals which do not change the radiated power of the CCMBS with time and temperature. Pilot carriers within the received spectrum are sampled by a directional coupler 510 and detected by a pilot detector and data receiver 512 to provide the following information to the CCMBS, namely reference levels for the amplifiers 504 and 508 to ensure optimum output level, a data channel for remote communication to the RBSMCE 236, and a frequency reference required for use by frequency translators 538 and 550 and a PCN interface 547. In a typical CATV plant two pilots are conventionally used for forward direction communications. One pilot in an upper part of the frequency range of operation usually provides information to compensate for the slope (difference in amplitude between lowest frequency and highest frequency signals induced by the characteristics of coaxial cable) of the link between the RBS and the CCMBS, and the other at a lower frequency, usually compensates for the overall attenuation in the link. An additional equalizer 506 may provide additional compensation for cable characteristics that the AGC and ASC amplifiers 504 and 508 cannot accommodate. For control of specific CCMBS functions or for use on existing CATV facilities where the pilot carriers are already reserved for specific uses, additional pilot control channels can be made available embedded within the spectrum reserved for radio telephony operation.

An output from the Forward coax subsystem is fed to the Forward RF output (FRFO) subsystem through a directional tap 510, and also to a duplexer 514. The FRFO subsystem provides the necessary frequency translation and amplification required to provide required RF coverage at the cell location. Signals destined for other CCMBS may be delivered to a coaxial subsystem from the duplexer 514, by means of which frequencies reserved for transmission in the forward direction may be inserted onto the patch cable 30 with minimum attenuation. Signals designated for the reverse direction may pass through the duplexing filter 514 from cable patch 30 to a conductor 516 from which they are available to the reverse coaxial subsystem.

Low power signals on conductor 511 will be changed from frequencies typically reserved for CATV, usually in the realm of 50 to 550 Mhz, to high power radio frequencies used by the cellular system, usually 800 to 1000 Mhz, by the frequency translator 538 and a hybrid power amplifier 539. The frequency band to be translated is typically 11 to 23 Mhz wide. The choice of frequency bands to use is at the cable operator's discretion and other frequency bands may be used.

Within the frequency translator subsystem 538, low level signals from conductor 511 are selected by a band pass filter 554 from the available input spectrum. This frequency block is connected to mixer 556 via conductor 555. A local oscillator 565 drives a mixer 556 with a suitable frequency to cause the selected signals to be heterodyned to an intermediate frequency, typically 45 or 70 Mhz, in known manner. The output 557 of the mixer 556 is band limited by a filter 558 providing rejection of image and preventing spurious mixer signals from reaching a second mixer 560. Mixer 560 is driven by a separate signal on line 563 from oscillator 565. A second heterodyne conversion in mixer 560 translates the intermediate frequency to the correct radio telephony frequency band. A filter 562 prevents undesired spurious mixer byproducts from reaching the hybrid power amplifier 539 used to deliver the desired frequency spectrum to the antenna 541. Where additional pilots are used, the filter 554 would be designed to accept their frequencies so that they may be passed to a control microprocessor 527 by a filter 566 while filters 558 and 562 would reject them to avoid spurious emissions by following subsystems. The oscillator module 565 is a frequency synthesizer, operating coherently and referenced to the signals derived from the pilot carrier. The output of the FRFO subsystem 544 is applied to the duplexer 540 and to the antenna 541 for distribution to mobile users within the coverage area of the microcell.

Within the hybrid power amplifier 539 signals on conductor 543 are split by splitter 581 and applied to two linear power amplifiers (PA) 584 and 585. Their outputs are combined by a combiner 588. This arrangement provides for a level of redundancy. If either amplifier fails operation of the CCMBS site is still assured but with a slight loss of output power. The amplifiers are separately powered from a power supply 551 to ensure that a fault in one PA does not affect the other. A sample of the combined output via a directional coupler 589 may be directed by line 590 to a loop back switch 549, the output of the directional coupler being attenuated by tap loss to within 10 Db of the maximum received signal appearing on a conductor 546 from the duplexer 540. A second directional coupler (not shown) provides a means to measure reflected power from the antenna as an aid to determining the operational characteristic of the CCMBS.

Radio telephone signals from a mobile 206 intended for the radio transceivers 220 at the RBS 205 are received by the antenna system 541 at the CCMBS and are returned on a reverse path to the RBSMCE, to the radio transceivers and finally to the MTSO for routing to the appropriate end user. Signals entering the antenna system 541 are electrically frequency separated by the duplexer 540 onto conductor 546. Low power signals output from the loop back switch 549 are frequency translated to frequencies compatible with conventional coaxial cable facilities, usually in the range 5–30 MHz. Frequency translated signals from subsystem 550 are forwarded to the reverse coax subsystem 501, which conditions the radio telephone signals together with any PCS signals from PCN interface 547 and adds them to the signals received on conductor 30 for transport to the RBSMCE at the RBS or warehouse.

Signals in the band 5 to 30 Mhz (or whatever other band is used for return signals) pass from the patch cable 30 through the duplexing filter 514 to a conductor 516 from which they are available to the Reverse coax subsystem 501. Radio telephony signals from mobile users and intended for the radio transceivers in the RBS or warehouse as received from neighbouring downstream CCMBS and frequency translated to appropriate CATV coaxial cable system frequency blocks are thus passed to the reverse coax subsystem, which acts to compensate the dynamic characteristics of the coaxial plant and provide a normalized spectrum on at the output of amplifier 521 such that mobile signals received locally and transposed to CATV frequencies by the reverse RF subsystem 553 can be combined with the amplifier output at the same level by a directional coupler 526.

Within subsystem 501, the received RF signals are conditioned by an automatic gain control amplifier 517 and an automatic slope control amplifier 521 to provide nominal output levels independent of path length and attenuation. Pilot carriers from the received signal are sampled by a directional coupler 523 and detected by a pilot detector and data receiver 524. These pilots provide the following information to the CCMBS, namely a reference level for the amplifiers 517 and 521 to ensure optimum output level, and a data channel for remote communication to the RBSMCE 236. It should be noted however that in some instances the gain and slope controls required in the reverse path are less stringent and may not be essential at every CCMBS.

Pilot carriers for the reverse path may be supplied by external equipment and applied to the conductor 30 or be provided by the microcontroller 527 in the final CCMBS in the CCMS, as part of an output data channel generated by a subsystem 533 and combined by a combiner 535 into the signal combined with the output of amplifier 521 by coupler 526.

The frequency translator subsystem 550 transforms signals at radio telephony system frequencies from the loop back switch 549 to a frequency block to be used in the reverse path from the CCMBS to the RBSMCE. This frequency block is coupled with other services through the combiner 535. The use of frequency translation allows for the stacking of multiple services on the same cable-based transport system. As will be shown in subsequent Figures, multiple antennas can be connected to multiple base stations through a single transport system by the use of frequency translation to enable placement of frequency blocks related to different base stations in distinct frequency allocations. It is important in cellular systems employing such multiple antenna arrangements to be able to route signals between a particular antenna and a particular group of base station transceivers. Cellular architecture requires this one to one correspondence between multiple antennas and cellular base station equipment, and thus direct coupling of these signals at cellular frequencies together is not allowed. The ability to multiplex these translated frequency groups over a single transmission medium and to demultiplex them at the other end as described meets these requirements, and provides a virtually transparent transportation medium enabling the CCMBS to provide a virtual radio base station at a great distance from a warehouse containing the actual cellular base station equipment.

The subsystem 550 receives signals on conductor 567 from the loop back switch 549 in the range of 800 to 1000 MHz. This signal is band limited by filter 568 prior to heterodyning by a mixer 570. A local oscillator signal 579 from a frequency synthesizer 577 translates the band limited spectrum from conductor 569 to an intermediate frequency on conductor 571 as described above in relation to subsystem 538. The intermediate frequency is filtered to remove image and spurious mixer products by a filter 572. An additional signal may be added upstream of mixer 570 to allow data communications with the RBSMCE and any reference signals required for upstream CCMBS units, from the microcontroller 527 via an interface 580. The addition of this signal at the intermediate frequency permits multiple CCMBS units operating in different frequency blocks, to communicate independently with the RBSMCE. These signals are heterodyned with local oscillator signal 578 in mixer 574 to provide a transport frequency block on conductor 532 which has been band limited and from which spurious signals have been removed by filter 576. The output band can, as previously stated, be any frequency group within the capabilities of the coaxial system as defined by the operator for a particular system.

Both frequency translation subsystems 550 and 538 are connected to the communications bus 537 of the microcontroller 527. This bus allows the microcontroller to program the frequency synthesizers and detect faults in frequency generation. This ability to select various frequency blocks allows the multiplexing required to transport multiple antenna groups as discussed above.

To enable selection from such multiple frequency groups, the filters 576 and 554 must be tune able over the desired spectrum of operation. Such filters are required to minimize co-channel interference in a densely utilized cable transmission system. They also reduce the performance requirements of filter 558 and 572, and reduce the composite signals applied to the mixers. Without the filter there are more signals at the mixer and the composite signal has greater amplitude, thus increasing the risk of intermodulation distortion. A standard TV tuning section provides appropriate capabilities.

The connection of a microcell base station, whether a CCMBS or an OCMBS, into a CCMS or OCMS has already been described with reference to FIG. 8, as has its connection to multiple antennas. Thus the output of a microcell base station 122 can be transported over a low cost coaxial distribution network to a multiplicity of antennas to provide a controlled, uniform, low power radio coverage. Some or all of these antennas may be active antennas, connected through Active Antenna Blocks (AAB) 300.

Figure 9:
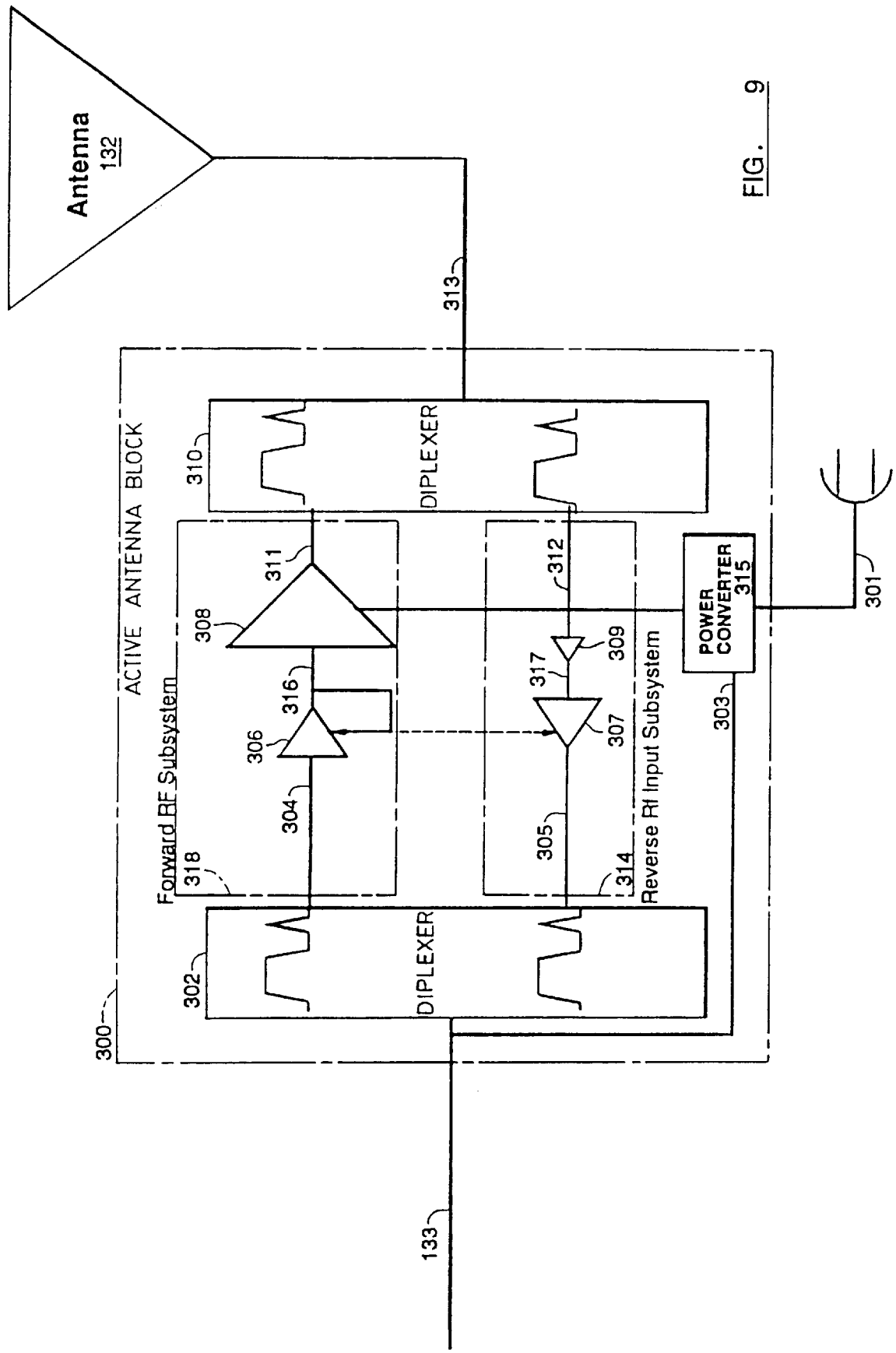
FIGS. 9 and 10 are more detailed schematic diagrams of blocks appearing in FIG. 8.

FIG. 9 shows a coaxially fed Active Antenna Block 300 in more detail. The AAB acts to change low power RF signals from coaxial conductor 133 to the appropriate radio telephone signal levels required at a particular site for transmission by the antenna 132. The use of an active antenna allows the placement of the antenna at substantial distances from the microcell base station by compensating the RF signals for the associated cable loss. The AAB allows for a more greatly expanded distributed antenna system than could normally be achieved. This is vital when arranging indoor cells for RF coverage within several layers of parking, shopping concourses, food concourses, street level access, and upper floors. The cabling of such a building, fed from one Power Amplifier through a distributed passive antenna system, would require very expensive conduit ducts for the cable, and large diameter heliaxial cable to obtain the low loss signal paths to the antennas needed to achieve the large coverage area. This imposes size and cost limits particularly since equipment redundancy is usually required to ensure continuous service. The use of AABs enables a greater coverage area to be achieved at lower cost.

The coaxial feed 133 carries radio telephony signals in a frequency division duplex manner intended for the portable users. Signals for transmission entering the AAB 300 are electrically separated from received signals leaving the block by duplexer 302. Frequencies in the block associated with transmission to the portable are delivered from the duplexer 302 to a Forward RF Subsystem on conductor 304. The signals in this frequency group are passed through an automatic gain control amplifier or cable equalizer 306 to compensate for the cable losses in cable 133. The compensation of cable losses allows the use of low cost but relatively high loss cable to be used in the distribution of signals to the antennas. Typically low loss cables are very expensive, and have a large diameter which require special attention in routing and installation which further increases costs.

There are several techniques for providing the reference required to control the AGC amplifier 306. In cellular telephony a control channel is always available inband to act as a reference pilot. Other means include the measurement of other signals present on conductor 133, such as out of band RF signals or AC or DC voltages on the cable, to act as the pilot or AGC control signal. This derived AGC signal is also used to precondition signals received by the AAB from the antenna 132 for injection onto the conductor 133 through duplexer 302.

The gain controlled signal 316 from amplifier 306 is applied to a linear power amplifier 308 which supplies the RF gain needed to achieve the input power required to the antenna. The output 311 of amplifier 308 is applied to a duplexer 310 for passing the amplified signals with low loss onto a conductor 313 for emission by antenna 132.

Power for the AAB is supplied either by the coaxial cable 133 or a power converter 315 connected to a local AC distribution outlet 301. Power conducted via cable 133 is coupled off without disruption to the radiotelephony signals through known means, onto conductor 303, and converted by converter 315 to appropriate voltage levels required by amplifiers 308, 307, 306.

Signals received by the AAB from the antenna 132 are electrically frequency separated by the duplexer 310 onto a conductor 312 and applied to a Reverse RF Subsystem which provides signal conditioning prior to being applied to coax 133. In subsystem 314, the signal from conductor 312 is applied to a low noise preamplifier 309 whose output is applied to the gain controlled amplifier 307 which amplifies the signal to a controlled level so that it can be combined with outputs from other AAMs at a common signal point and level independent of cable lengths. Output 305 of amplifier 307 applies to the duplexer 102 for insertion onto conductor 133.

The use of such an AAB permits the use of low cost cabling to locate multiple antennas to provide a desired RF coverage, by compensating for the cable loss associated with the cable link. The use of AABs also provides a level of redundancy and fault tolerance, for where several of these devices are used to serve an area, failure of one component does not necessarily mean loss of the entire coverage. With several spatially distributed AABs, each operating at low power, the amplifier size and power requirements of individual amplifiers are reduced. This inherently improves reliability since failures due to heat build-up are minimized, requirements for forced cooling can be eliminated and, with proper, overlapping coverage obtained by appropriate antenna placement, failure of one AAB will not drastically reduce the service coverage area.

Figure 10:
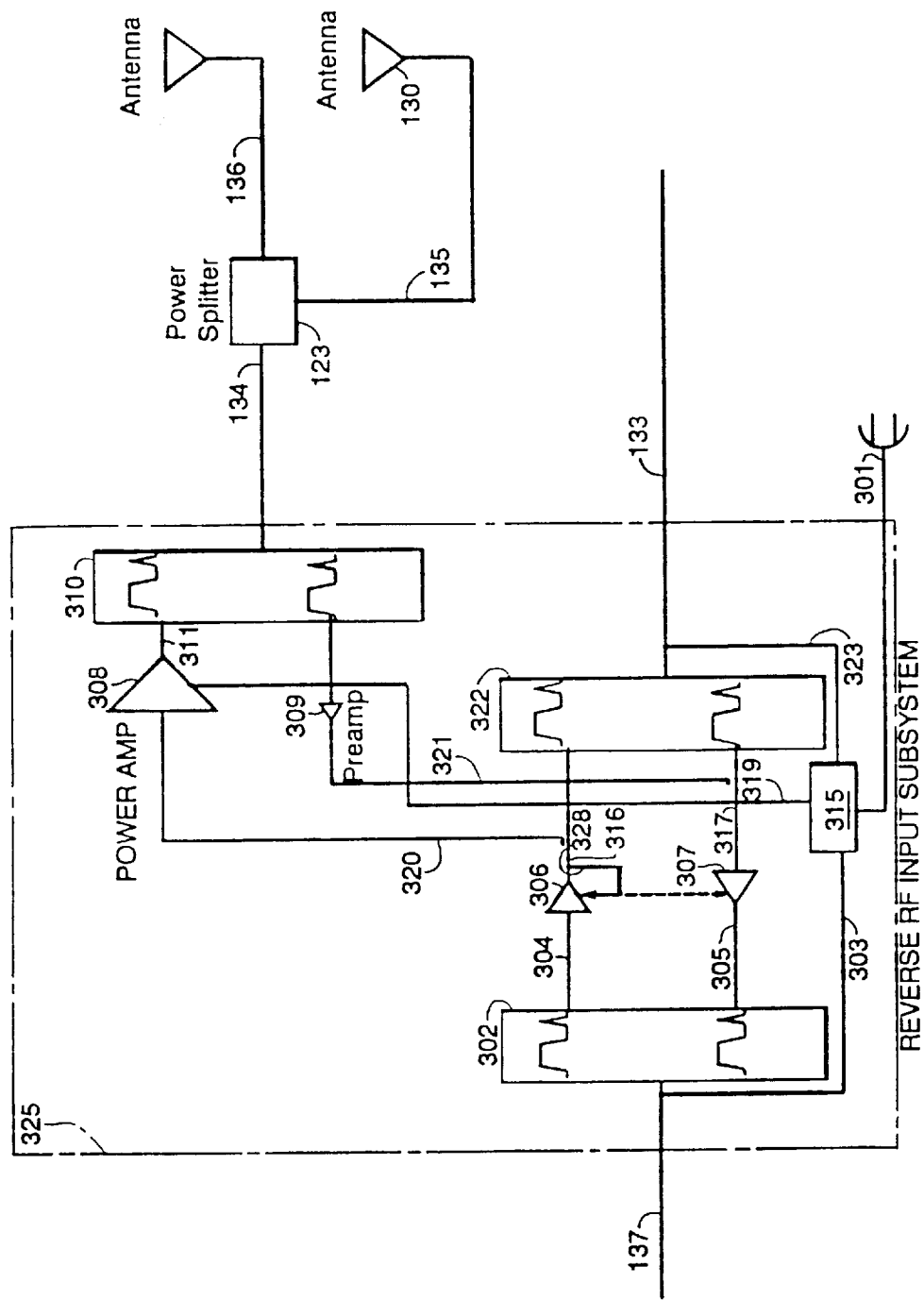

A further development of the AAB is the coaxial line driver (CLD) 325 shown in FIG. 10. In effect a CLD is an AAB with an additional port to allow it to be inserted in-line so that further cabling and additional antennas can be interconnected to the distributed antenna system. It may replace the power splitter 131 shown in FIG. 8, and provides the same functionality as the splitter but with no loss in the RF signal. As mentioned earlier the use of active antenna devices allows enlargement of site coverage and provision of overlapping coverage areas for fault tolerant operation.

The CLD is constructed similarly to the AAB, and its parts are identified by the same reference numerals, except that a further duplexer 322 is provided connected to the output 316 of amplifier 306 and the input 317 of amplifier 307 so that the unit can provide an in-line connection between cables 137 and 133 with compensation in both directions to allow for cable losses. The input to power amplifier 308 is through a line 320 and a coupler 328 connected to output 316, and the output from preamplifier 309 is through a line 321 to a coupler 319 to the input 317 to amplifier 307. A connection 323 is provided if necessary to establish a power supply connection between the cables 137 and 133.

The CLD is most useful in the supply of radiotelephony coverage in and around buildings. Long haul transport to a building from a remote RBS or RBSW requires the use of the Optically Connected Microcell Base station (OCMBS) or the Coaxially Connected Microcell Base station (CCMBS) already fully discussed herein.

The difficulties associated with the construction of radiotelephony systems may be significantly reduced by the use of the invention. The transport of radiotelephony signals using available portions of the radio frequency spectrum over fibre optic and coaxial cables, which are available in abundance in urban centres, provides radiotelephony service providers with a means for distribution of their signals to antenna locations at a substantially lower cost than would otherwise be the case. The large installed base of coaxial cable used by CATV operators can be effectively exploited by the invention at minimal marginal cost.

It will be noted in FIG. 1 that the CCMBS and OCMBS which are connected to the warehouse (RBSW) or conventional RBS site also form a "tree-and-branch" configuration similar to that used in coaxial CATV systems to distribute TV program signals from one or more hubs or headends to a multitude of subscribers. Normal "two-way" or bi-directional coaxial CATV systems use duplexing filters to separate forward and reverse signal flows on a single cable. However in recent years some operators have been installing dual cable networks to increase the capacity of their system. Forward direction TV signals are injected into the cable plant at the head end, and trunk repeaters (forming the tree portion) are used to regenerate and condition the TV signals as they pass through the coaxial cable plant. Feeder cable, and bridger amplifiers connected to the trunk, provide the branches from which local subscribers are fed.

By utilizing a coaxial CATV system to distribute the signals of a radio base station or group of radio base stations at the RBSW or RBS to multiple antennas or antenna groups, the coverage and capacity of such base stations can be greatly increased. The CCMB plus the CATV facility provide an effectively loss free transmission path between mobile radiotelephony users and the main portion of the radio base stations at the RBS warehouse or conventional radio base station which allows much greater distance between the mobile and that main portion than would otherwise be possible, since, to the mobile, each antenna or group of parallel driven antennas becomes a virtual base station relocated with the antenna or antennas, even though the actual base station may be far distant. Calls are handled according to techniques already well known in the cellular radio art, or as set forth in the publications listed above.

A multiplicity of CCMBS may be connected to the CATV facility through a community, with widely scattered portable mobiles able to communicate with the Mobile Switched Telephone Network (MSTO) through base stations located remotely from the CCMBS at a common warehouse or conventional radio base station, by employing a CATV system. The equipment required at the warehouse or conventional RBS may be provided by means of appropriate circuit modification of conventional radiotelephony base station equipment, to provide reception and transmission in appropriate frequency bands for interface with the CATV system, or an interface unit may be connected to radio base station antenna ports, the unit operating in a complementary manner to a CCMBS to provide necessary frequency conversion and matching.

Whilst the foregoing description is related to an exemplary embodiment of the invention relating primarily to cellular radiotelephony, it should be appreciated that the invention can also advantageously be employed in a PCN and mobile data systems with suitable changes of parameters, and indeed in any application where the provision of wide area base station coverage is desired in a multi-channel radiotelephony system. Whilst transceivers in the system described have commonly been referred to as radiotelephony mobiles, it should be understood that the transceivers may be of any form, whether handheld, mobile, data terminals, or even fixed where a conventional wired telephone circuit cannot be conveniently or economically provided. Whilst an arrangement in which the Common Air Interface (CAI) to the radiotelephony mobiles uses a Frequency Division Duplex (FDD) format, the invention is also applicable to Time Division Duplex (TDD) format, apart from those features specifically predicated upon the use of FDD. Both the CCMS and the OCMS are applicable to Frequency Division Multiple Access (FDMA), Time Division Multiple Access (TDMA), and code division multiple access (CDMA) systems with suitable changes of parameters apart from those features specifically predicated upon the use of FDMA.

FIGS. 11–14 illustrate an implementation of a PCN (personal communications network) utilizing the invention. Elements of such a network, implemented so as to share coaxial or fibre transportation facilities with a cellular network and possibly other services, have been shown in the embodiments previously discussed.

Figure 11:
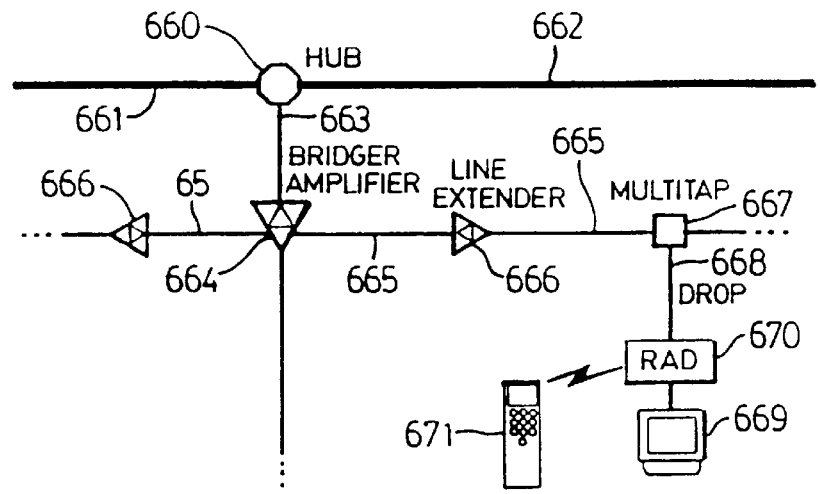
FIG. 11 is a schematic diagram showing part of a CATV system equipped to provide an interface according to the present invention.

This implementation makes use of an existing CATV distribution network, the topology of which has been found by the inventors to be well suited to the provision of PCS utilizing the invention. FIG. 11 shows a segment of a CATV facility including a hub 660 connected to a headend via a supertrunk 661 as well as to the PSTN via voice circuits 662. Coaxial cable trunks 663 with bridger amplifiers 664 convey signals between the hub 660 and coaxial distribution feeders 665. Line extenders 666 amplify the signals to compensate for signal attenuation caused by cable and by couplers contained within multitaps 667. Coaxial drop cables 668 (of which only one is shown) provide cable television service to residences and businesses where television sets 669 are the usual terminal equipment. A remote antenna driver (RAD) 670 is connected to the drop 668 to allow portable telephone handsets 671 in the vicinity of the drop to communicate with the remaining equipment of a radio base station or stations contained in the hub 660. This equipment at the hub is referred to as the base station(s) although it should be understood that the entire system to be described, including the CATV system and RADS, together constitutes a form of distributed radio base station which acts collectively as the interface between the PSTN and the handsets 671. A multiplicity of RADs 670 may be connected to a multiplicity of drops 668 and multitaps 667 on a multiplicity of feeder lines 665 and line extenders 666 which in turn connect to a multiplicity of bridger amplifiers 664 on a multiplicity of trunks 663 connected to a common hub 660. Each bridger amplifier 664 is equipped with amplifiers and duplexing filters to support two-way operation in a manner conventional in the art of two-way CATV systems. Similarly each line extender 666 is equipped for two-way operation such that signals in the range of frequencies 5 to 30 MHz may pass from the RAD 670 to the hub 660. Signals above 50 MHz, up to the design limit of the amplifiers 664, line extenders 666 and multitaps 667, which limit is typically 400 to 550 MHz, are conveyed from the hub 660 to RAD 670.

Although FIG. 11 shows connections being established to the PSTN through equipment located at the hub 660, such connections could also be established through similar equipment located at the headend, particularly in the case of a relatively smaller CATV system. Moreover, the coaxial trunk cables connecting bridging amplifiers 664 to the hub 660 may be replaced by optical fiber cables with appropriate transducers to support two-way signal conveyance in accordance with normal CATV system practice, without affecting the practicality or operation of the invention.

Figure 12:
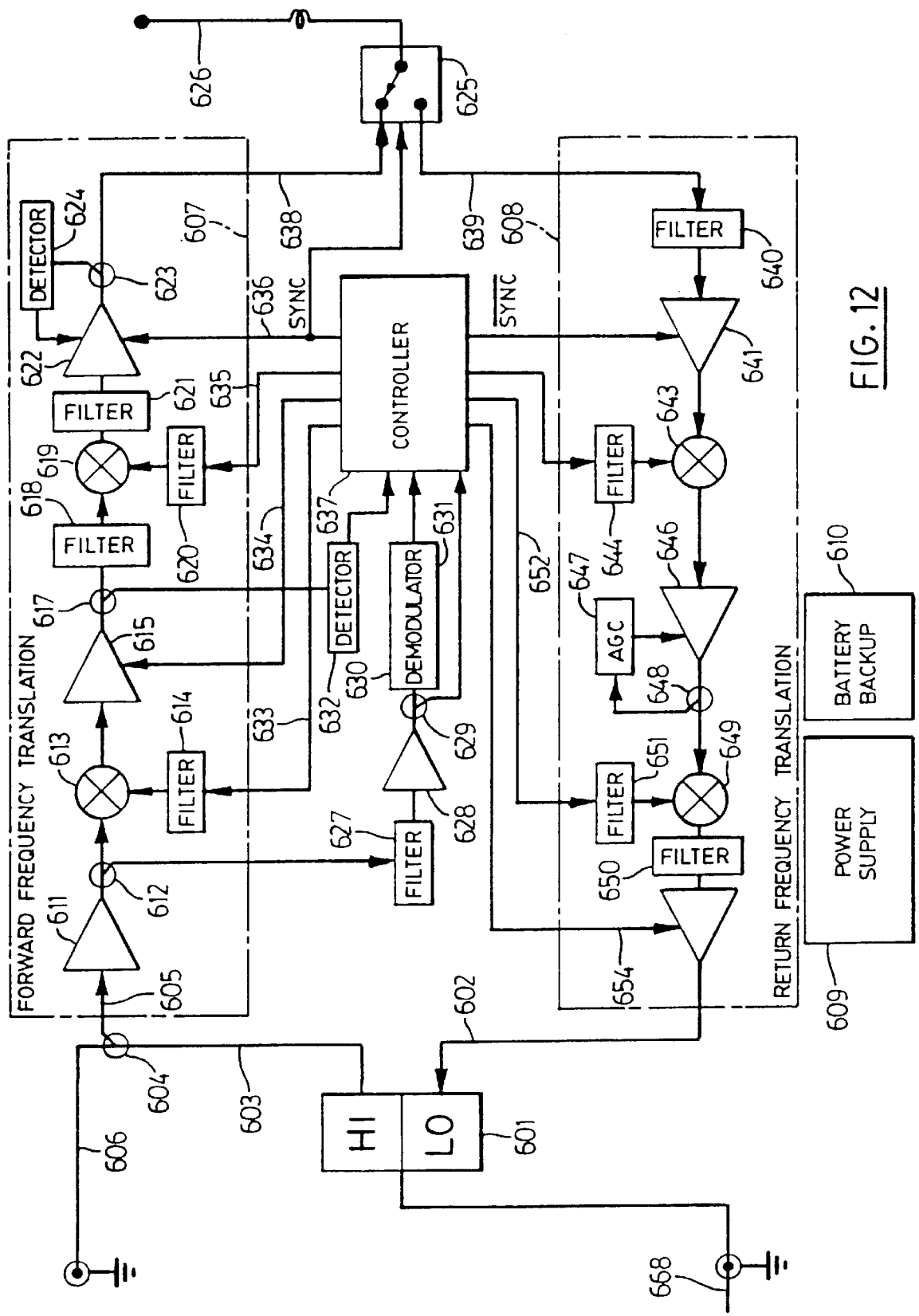
FIG. 12 is a more detailed schematic diagram of a remote antenna driver incorporated in the system of FIG. 11.

Referring now to FIG. 12, the RAD 670 will be described in more detail. The drop cable 68 is connected to a duplexing filter 601 by means of which frequencies in the range 5 to 30 MHz present on a conductor 602 may be inserted onto the drop cable 68 with minimum attenuation. Signals above 50 MHz pass through the duplexing filter from the drop cable 668 to a conductor 603 from which they are available to a forward frequency translation subsystem 607 via a coupler 604 and a conductor 605. A low attenuation path through coupler 604 is made available via conductor 606 to a suitable connector on the RAD 670 for connection of a television 669, for the purpose of receiving television programming normally available on the CATV facility. The RAD 670 has no effect on normal CATV service other than a small attenuation of signals above 50 MHz.

PCS signals from the radio base station equipment in the hub and intended for a portable handset 671, are passed to the forward frequency translation subsystem 607, which acts to change low power signals from conductor 605, in any one of a block of channels in a pre-determined band of frequencies typically having a bandwidth equal to that allocated for PCS channels, but located between 50 and 550 MHz, into relatively higher power signals for transmission in the frequency band allocated for PCS channels receivable by the handset 671, typically in the range 900–1000 MHz. The transmission signals are delivered to an antenna 626 via an electronic switch 625. The band of frequencies to be so changed will typically be from 1 to 25 MHz wide, as determined by the portion of the RF spectrum allotted to the PCS. All RADs 670 will perform a similar translation of any portion of the allocated PCS band of frequencies.

Within the subsystem 607, the low level downstream PCS signals from conductor 605 are amplified by a preamplifier 611 with fixed gain and connected via a coupler 612 to a mixer 613. A local oscillator 614 drives the mixer 613 at a suitable frequency in known manner to cause the PCS signals to be heterodyned to an intermediate frequency, typically in the vicinity of 45 MHz or 70 MHz, and further amplified by a variable gain narrow band amplifier 615 whose output is connected to a band pass filter 618 via a coupler 617. The intermediate frequency, band limited, PCS signals are heterodyned a second time by a mixer 619 which is driven by a local oscillator 620 so as to be translated to the desired transmission frequency band. Band pass filter 621 prevents spurious mixer signals from reaching a power amplifier 622, which delivers the maximum allowable PCS signal power to the antenna 626 via a coupler 623 and the electronic switch 625. A sample of the power amplifier 622 output is diverted by the coupler 623 to a broadband detector 624 to provide an automatic level control signal which limits the gain of the power amplifier and so prevents excessive output power which might otherwise result in signal distortion and unlawful emissions.

A sample of the input signal is diverted by the coupler 612 to a filter 627 which extracts control and frequency reference signals, which signals are subsequently amplified by an amplifier 628 and demodulated by a demodulator 630 to provide control information to a controller 637 via conductor 631. A frequency reference is provided to the controller via coupler 629 to ensure that the various local oscillators in this and other RADs, which are frequency synthesizers, are operating coherently at predetermined frequencies.

The coupler 617 is used to divert a sample of the RF power at the output of the variable gain intermediate frequency (IF) amplifier 615. A power detector 632 delivers a signal to the controller 637 used for controlling the gain of the amplifier 615 by a signal output on a conductor 634. The signal amplitudes in this subsystem also provide an indication of the input signal level to the RAD and thus the net RF path attenuation between the hub 660 and the RAD 670. The estimated path loss is used to provide a signal on conductor 654 which controls the gain of an amplifier 653 for optimum launching of PCS signals received from the portable handset 671 onto the CATV facility for conveyance to the hub 660. A frequency conversion subsystem 608 transforms low power emissions received by the antenna 626 from portable handsets 671 on channels allocated in the PCS frequency spectrum into higher power replicas displaced in frequency so as to be compatible with the upstream transport capabilities of conventional bi directional CATV facilities, specifically an allotted band within the 5 to 30 MHz frequency band wide enough to accommodate the allocated block of reception channels.

The subsystem 608 is connected to the antenna 626 through the switch 625 by conductor 639, which passes signals through an input filter 640 to a fixed gain amplifier 641 with conventional squelch capabilities. Provided the received PCS signals are of sufficient level to give reliable communication, the squelch of the input preamplifier 641 will be removed and the signals will be delivered to a mixer 643 which is driven by a local oscillator 644. The filter 640 ensures that unwanted signals outside the desired portion of the PCS frequency band are attenuated sufficiently to prevent interference likely to disrupt reliable communications. The output of the mixer 643 is at an intermediate frequency, typically 45 MHz or 70 MHz, and is amplified by a band-limited variable gain amplifier 646 and delivered to a mixer 649 via a coupler 648. A local oscillator 651 drives the mixer 649 such that its output contains the PCS signals translated to the desired band within the range of frequencies 5 to 30 MHz. A filter 650 prevents undesired mixer products from passing to the output amplifier 653. The coupler 648 diverts a sample of the PCS signal to an automatic gain control module 647 in order to provide optimum gain of the amplifier 646 relative to the PCS signal level received at antenna 626, which may vary over a very large range. More specifically the amplifier 646 operates at maximum gain for the lowest received signal power, its gain decreasing linearly with increasing received signal power until minimum gain is reached, whereafter it maintains minimum gain as receiver input power increases further.

The electronic switch 625 is controlled by the controller 637 such that it is synchronized with signal packets being exchanged between the RAD 670 and the portable handset 671. Suitable control information, extracted from the downstream signals, is delivered to the controller 637 via the demodulator 630 on conductor 631 to ensure that synchronization is achieved. Because of limitations on the isolation achievable in practical switches between the conductors 638 and 639, the amplifiers 622 and 641 are controlled by signals on conductors 636 and 642 so as to turn the amplifiers off when not connected to the antenna 626.

The RAD may be contained in an aesthetically pleasing container suitable for installation in homes or offices and is typically powered by commercial 120 V AC via a wall mount power supply that delivers low voltage AC power to it. A low voltage power supply 609 uses this low voltage AC input to generate the direct current voltages necessary to power the RAD. A battery 610 may be used to power the RAD during interruption of the commercial power source. Outdoor versions of the RAD may be powered by 60V square wave power conventionally available on the coaxial feeder cable 665, the power supply being adapted in known manner to utilize this supply. As a further alternative, the RAD may be housed within a cable television converter unit, and share the power supply of that unit. This alternative has the advantage that it is more likely to provide a favourable location for the RAD antenna.

Most functions of the RAD described so far are substantially independent of the implementation of the PCS, since they are limited to block frequency conversion, power amplification and matching to the RAD antenna and to the CATV drop.

Several proposed radio Common Air Interfaces (CAI) for PCS radio communication employ Time Division Duplex (TDD) operation. As a result, the RAD must be designed for TDD operation on the radio side. A CATV plant will not support TDD operation, however, as it is frequency-divided into two bands: a high band which handles downstream transmission (head-end to hub to subscriber) and a low band which handles upstream transmission (subscriber to hub to headend).

To accommodate a CATV transport system from the remainder of the base station equipment, the latter is designed to provide Frequency Division Duplex (FDD) output. The duplex channels are divided into "transmit" and "receive" links which are transported on the CATV downstream and upstream bands, respectively.

As an example of bandwidth requirements, assume a PCS system using CT-2 Plus. Such a system might occupy 8 MHz of bandwidth, with a nominal 80 channels spaced at 100 KHz between channels. In the simplest case, the transmit link would be carried downstream in an 8 MHz allocation (eg. 500–508 MHz) and the receive link would be carried upstream in an 8 MHz allocation (eg. 22–30 MHz). A conventional duplexing filter is used to couple the base station equipment to the CATV plant.

Several similar processing sections may be connected in parallel within a RAD, each operating on a subsection of the total bandwidth occupied by the radio signals. In this way the performance of the RAD may be improved relative to a large variation in signal amplitudes received at the antenna. Different processing of different amplitudes will allow a more uniform transmission on the cable system. This may be employed only in the upstream direction, or in different subsection divisions for upstream and downstream processing.

Conversion of FDD to TDD is performed in the RAD by the switch 625 under control of the controller 637 which performs the necessary time duplexing. An FDD radio link between the RAD and the handheld units can however also be accommodated by replacement of the switch with a suitable duplexing filter. For the purposes of description, TDD operation of the link is assumed. The controller would regenerate the synchronization signals SYNC and SYNC* (the asterisk denotes the conventional NOT overbar) on lines 636 and 642 from the downstream signal sample received from demodulator 630.

In a conventional PCS system, the handset communicates directly with the base station via a radio frequency link. The only time delay in the path is due to radio propagation delays between the base station and the handset. Due to the short radio range of these systems (typically less than 300 m for reliable radio coverage) these propagation delays are short. As a result, the digital transmission schemes developed for such systems do not incorporate elaborate equalization to compensate for time delays, and FDD operation is practicable without such equalization. The incorporation of CATV plant into the base station-to-handset transmission path does however introduce substantial time delays.

In a conventional PCN base station, the transmitter and receiver sections are synchronously coupled. A clock switches the transceiver between transmit and receive modes. The time frame employed depends on the Common Air Interface. CT-2 and CT-2 Plus employ a 2 ms time frame (Tx 1 ms, Rx 1 ms) while CT-3 employs a 16 ms time frame (Tx 8 ms, Rx 8 ms). This mode of operation requires that the base-to-handset data burst be closely followed by the handset-to-base data burst. A lengthy delay may cause the first few bits of a transmission to be lost resulting in no communications being established between base station and handset.

A CATV compatible PCS base station requires that the transmitter and receiver sections be asynchronous, i.e. the receiver must be allowed to 'slip' in time relative to the transmitter, so that received packets can be processed when received outside a time slot allocated for reception, and then delayed further so as to fall into such a time slot. Each transceiver within a multi-transceiver base station must employ an independent slip timing buffer so as to compensate for varying propagation delays in a system employing a multiplicity of distributed RADs. This is described further below with reference to FIG. 4.

The handsets do not suffer from CATV induced delay because they are configured to slave their transmission to the data bursts or packets which they receive from the base station. The TDD to FDD translation at the RAD is also slaved to the data bursts received by the handset and since it occurs in close physical proximity to the handset, no propagation delays between the handset 671 and the FAD 670 are large enough to cause a problem. In other words neither the RAD nor the handsets need to make any provision for propagation delays within the CATV system since it is the responsibility of the base station equipment at the hub (or headend) to make such provision based on the timing of the upstream packets it receives from the RAD.

When the CAI between the RAD and the handset operates in TDD mode and the proposed CATV transport system (Base Station-to-RAD) operates in an FDD mode, the CATV bandwidth is under-utilized because the transmit bandwidth is active only half the time and the receive bandwidth is active only half the time.

In order to utilize more fully the CATV transport capacity, a technique referred to as "Even/Odd" channel assignment can be utilized to increase the loading of the CATV plant and thus increase efficiency.

To take an example, each CT-2 Plus channel occupies a bandwidth of approximately 200 KHz. Therefore in an 8 MHz allocation, 40 channels may be transmitted simultaneously without adjacent channel interference. These 40 channels (the "even" channels) would be active during the transmit cycles of a first group of RADs designated "even". Also connected to the same CATV plant would be an approximately equal number of "odd" RADs, which would be in the receive mode while the even RADs are in the transmit mode. A total of 40 channels can thus be received simultaneously without adjacent channel interference. At any given time, therefore, there are up to 40 channels in the transmit mode and up to 40 channels in the receive mode for a total of 80 active channels in an 8 MHz allocation.

During a first phase of the synchronization signal used to operate the switch 625 in the RADs, the odd RADs would be transmitting on up to 40 channels and the even RADs would be receiving on the even channels, whilst during a second phase, the operation would be reversed. The only difference between 'odd' and 'even' RADs is the relative phase of the signals SYNC and SYNC, which can be controlled by a signal from the equipment at the hub or headend. The RADs can be dynamically or manually assigned to operate in one of the two phases by a signal from the hub or headend equipment.

A CATV system used for PCS systems must allow for the assignment of a block of channels in a contiguous frequency band to the service. If the radio CAI interface employs a 4 MHz spectrum allocation then an exclusive and contiguous 4 MHz of CATV spectrum must be assigned in each of the downstream and upstream paths. If this is not the case then the design of the RAD becomes prohibitively complex. Similarly, if the radio CAI is assigned an 8 MHz allocation, and the CATV transport is designed to handle the entire allocation, then an exclusive and contiguous 8 MHz of CATV spectrum is required in each of the downstream and upstream paths.

Except for this requirement, however, the actual frequency assigned is not restricted to any particular part of the CATV frequency spectrum. The actual assignment is determined by the CATV plant operator and is a function of the capabilities of the plant. An essential requirement, of course, is that the plant be capable of bi-directional operation.

The actual spectrum allocations are a function of traffic requirements, CATV system architecture, and utilization of the spectrum for applications other than PCS. If necessary, several blocks of spectrum can be assigned to the service to increase capacity. Different versions of the RAD would then be employed in the system to translate the CATV spectrum blocks into the radio air spectrum.

Frequency re-use is a function of CATV system architecture. If a block of frequencies is employed at the headend of a distribution system, then that block may not be re-used again in that system. On the other hand, if the block of frequencies is used at a hub, then the block of frequencies may be re-used at other hubs, in a technique analogous to a technique known as "cell-splitting" in the cellular telephone industry, used to increase frequency re-use as the density of cellular subscribers increases over time.

Pilot signals may be used for various functions in the proposed system. A downstream pilot signal may be used for base station-to-RAD signalling, and an upstream pilot signal may be used for RAD-to-base station signalling. The pilot signals may be located in the PCS transport band or an out-of-band allocation may be used. A number of modulation techniques are also possible. The actual allocation and modulation technique can be determined by the CATV operator to suit system requirements. At least a downstream pilot is desirable as a simple means to provide the synchronization signal for TDD switching, and a frequency reference for the frequency translators employed in the RAD.

The downstream pilot may also be modulated with data at the base station to control various functions at the RAD. These possible functions include:

a) "Even/Odd" channel block assignments
b) Spectrum block assignment
c) Output power control (RAD-handset interface)
d) Remote enable/disable of RADs
e) Input level control (RAD-CATV interface)
f) Output level control (RAD-CATV interface).

An upstream pilot generated by each RAD can provide functions such as acknowledgement of control messages and power failure or device failure reporting.

In addition to these PCS-related functions, the two pilots can also be used for various other purposes. More specifically, they can carry data related to auxiliary services already proposed or implemented in two-way CATV systems such as special functions related to the CATV operation e.g. Pay TV, Pay-per-view TV and remote decoder enable/disable, and telemetry control of household utility services such as electricity and natural gas.

Figure 13:
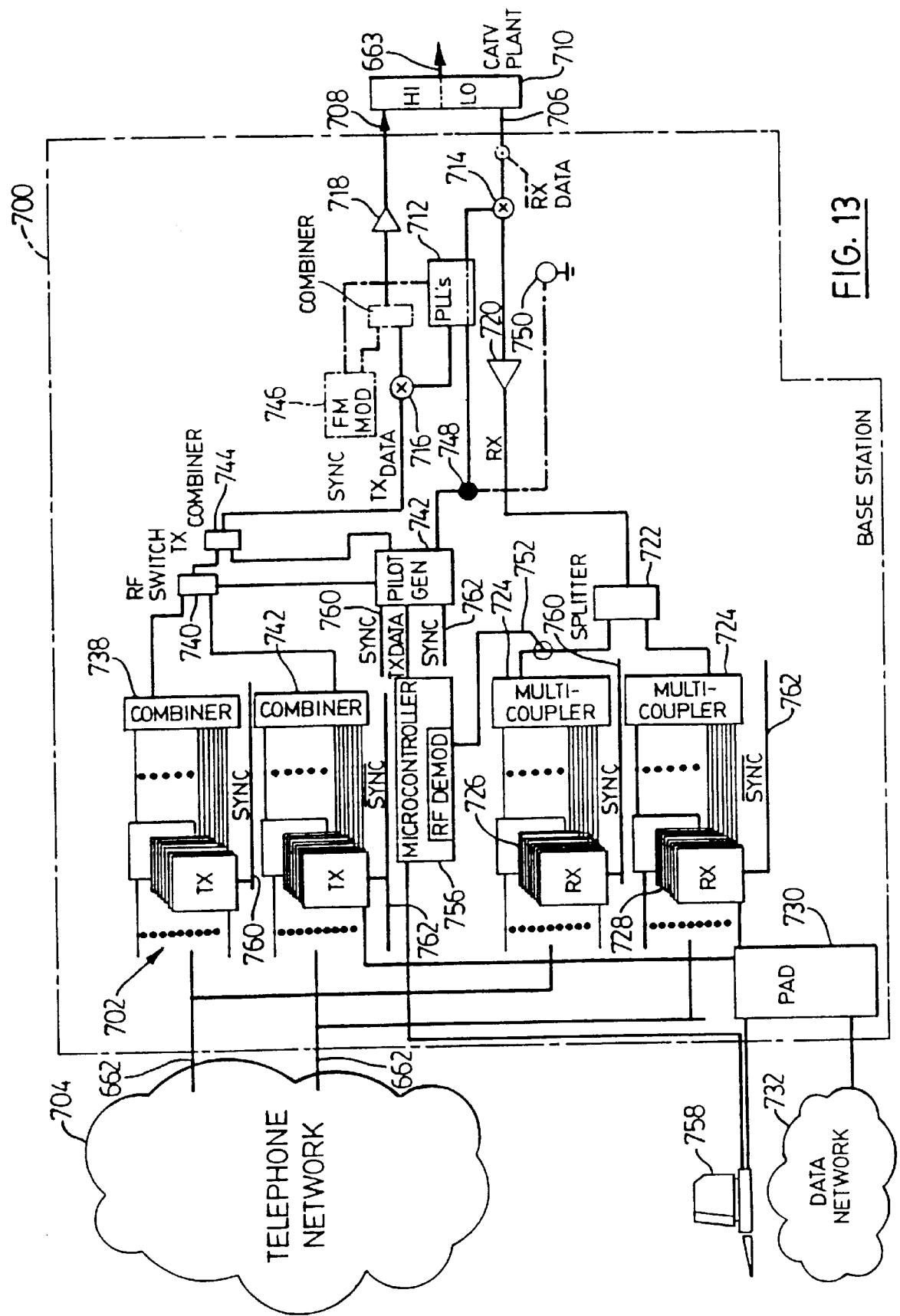
FIG. 13 is a schematic diagram showing an interface to a PSTN incorporated in a hub of the CATV system of FIG. 11.

Referring now to FIG. 13, there is shown exemplary base station equipment 700 provided at the hub 660 (or headend) for connection to multiple twisted pair circuits 702 forming the connection 662 to a PSTN 704. The base station equipment provides input and output signal lines 706 and 708 which are connected to the conventional CATV plant 710 at the hub (or headend) in which the signals are inserted into or extracted from the cables 663 extending out of the hub using conventional techniques. In the particular example being discussed, the downstream signals on line 708 are in a selected available frequency band, of a width corresponding to the band width allotted to the PCS service being implemented, somewhere within the 50–550 MHz frequency band allocated for downstream signals. The upstream signals are in a selected available frequency band in the 5–33 MHz frequency band allocated for upstream signals. It will be understood of course that, whilst these upstream and downstream allocations are typical of modern CATV installations, they may be varied in which case the frequencies utilized for upstream and downstream PCS signals will be selected accordingly.

If the signals on lines 706 and 708 are to be provided and processed using conventional base station equipment intended for processing signals for direct transmission to and reception from PCS transceivers, then these signals must be translated to and from the frequencies utilized by the PCS air interface. In such a case, the upstream signals on line 706 are applied, together with a local oscillator signal from a phase locked loop synthesizer 712 to a mixer 714 to generate signals in the PCS air interface band. The channel frequencies so generated will be the same as those utilized for communication between the transceivers 671 and the RADs 670. Likewise, the base station signals to be transmitted on line 708 are translated, by a further mixer 716 receiving a local oscillator signal from the synthesizer 712, to the frequencies utilized for communication between the RADs 670 and the transceivers 671. The downstream signals are amplified by a bandpass amplifier 718 before application to the line 708, the pass band of the amplifier corresponding to the downstream CATV allocation for the signals, and the upstream signals are amplified by a bandpass amplifier 720 having a pass band corresponding to that of the base station receiver equipment. If the base station equipment is adapted to handle the allocated CATV frequencies directly, it will be understood that the mixers 714 and 716, and the synthesizer 712, may be omitted.

The upstream signals from the amplifier 720 are applied to a splitter 722, which forwards the signal to multicouplers 724 serving two groups 726 and 728 of receiver cards each providing an interface to a PSTN circuit 702. According to the nature of the PSTN circuit, the signals output by the cards may be analog signals or include an interface to provide pulse code modulated signals such as a standard T1 interface. The T1 interface may be an intelligent interface including a multiplexer with a packet assembler/disassembler (PAD) 730 for routing data or facsimile signals to a data network 732.

Signals from a PSTN circuit 702 pass to a transmitter card in one of two groups 734 and 736, which cards may be interfaced to that circuit as described above in relation to the receiver cards. Outputs from the transmitter cards are passed to combiners 738 and thence to an RF switch 740 which selected the outputs of either group 734 or group 736 according to the phase of a synchronizing signal SYNC or SYNC* received from a pilot signal generator 742. A pilot signal generated by the generator 742 and modulated with this synchronizing signal is also combined with the transmitter output by a combiner 744 to perform the functions of the downstream pilot signal already discussed above. If an out-of-band pilot signal is to be used, and the mixer 716 is utilized, a somewhat different arrangement is needed so that the pilot signal carrier is not modified by the mixer 716. In this case the synchronizing signal and other data to be carried by the pilot is supplied to a frequency modulator 746 together with a carrier frequency generated by the synthesizer 712, and the pilot signal is combined with the transmitter signals by a combiner 748 downstream of the mixer 716. The pilot generator 742 and the synthesizer 712 receive a common reference frequency from an internal frequency reference 748, or an external reference 750 if frequency coherence with other base stations is needed.

Upstream pilot signals, already discussed above, may be recovered if utilized from the received signal on a line 752, and applied through a demodulator 754 to a microcontroller 756, equipped with a terminal 758, which supervises the transmission and reception of data carried by the pilot signal and supplies data to be transmitted to the pilot generator.

The receiver and transmitter cards operate generally as is conventional in the cellular telephony and PCS art, with each card being capable of receiving or transmitting a signal on any channel of the block of channels comprised by the PCS band, and the control functions required for allocating channels and generally supervising communications are also conventional in this art. Since they form no part of the present invention they have not been described nor illustrated in detail. As however has been previously mentioned and will be described further below, provision must be made in the receiver cards to allow for the substantially larger and variable propagation delays which will occur in a CATV network as compared with conventional short range radio communication between base stations and portable or mobile transceivers.

In the example described, the base station equipment is grouped in such a way to allow 40 channels in the CT-2 Plus format to be combined together during the transmit phase of the Time Division Duplex (TDD). Although the nominal RF channel spacing in CT-2 and CT-2 Plus is 100 KHz, the actual bandwidth consumed by the modulation of this channel is actually 200 KHz. In formats such as CT-2 or CT-3, the number of channels would be adjusted accordingly (20 channels for CT-2).

To obtain the maximum number of channels over the plant it is necessary to synchronize all of the transmit portions of the CT-2 equipment, using the synchronization signals SYNC and SYNC* on lines from the pilot generator 742. This prevent spill overs or dispersion effects on what would appear to be adjacent channels. This bandwidth requirement reduces the total number of available channels to half under worst case conditions. The CATV plant however provides a bi-directional frequency duplex trunk system. When the TDD CT-2 system is mapped into the CATV plant system using frequency translation techniques it is found that during the receive portion of the TDD cycle the RF energy in the CATV plant is zero for the block of frequencies being utilized. This means that this block is available for use, and the odd/even interleaving technique outlined above can be implemented.

In describing FIG. 13, it has already been noted that duplicate sets of receiver cards 726, 728 and transmitter cards 734 and 736 are provided. Each first set of cards is provided with the synchronization signal SYNC on line 760 and each second set of cards with the synchronization signal SYNC* of reverse phase on line 762, such that only the first sets or the second sets are strobed to output receive or transmit signals at any one time. The operation of the switch 740 is also controlled by the pilot generator 742 so that only the active set of transmitter cards is connected to the CATV network at any one time.

A similar switching technique cannot be used in respect of the receiver cards since the propagation delays suffered by the received signals in different channels will be different according to the origin of the signal. Individual adjustment is therefore necessary at each receiver card, and one technique for achieving this is shown in FIG. 14.

Figure 14:
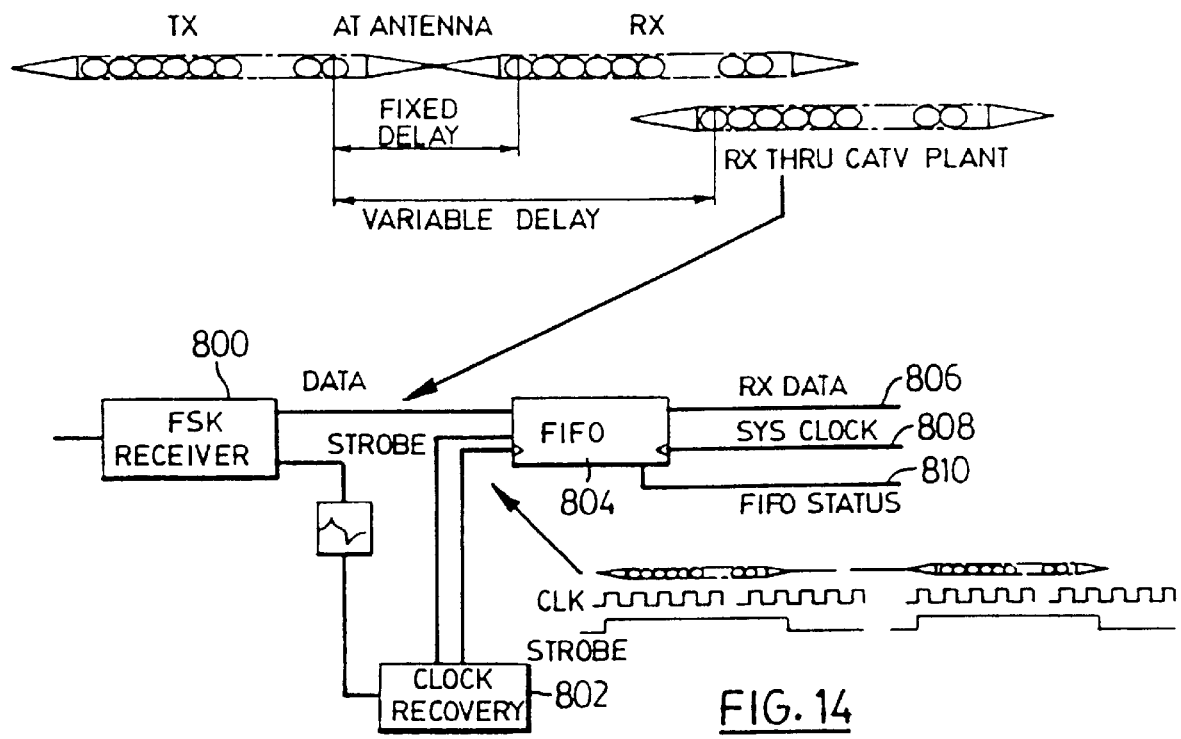
FIG. 14 is a schematic diagram of part of a base station receiver illustrating means compensating for propagation delays in the CATV system.

Referring to FIG. 14, showing schematically a portion of one of the receiver cards in sets 726 and 728, a signal from one of the multicouplers 724 is applied to a frequency shift keying (FSK) receiver 800 to recover data from received data packets. In a typical CT-2 or CT-2 Plus PCS, signal packets are transferred in TDD to and from the transceivers in alternate 1 ms intervals to provide a 2 ms cycle with transmit packets Tx from base station to transceiver and receive packets Rx from transceiver to base station following each other in immediate succeeding time slots at the transceiver, as shown at the top of FIG. 14.

As a result of propagation delays in both downstream and upstream passage through the CATV system, there is likely to be a significant and highly variable delay between the end of the period allowed for transmission of a Tx packet at the base station, and the reception of the corresponding Rx packet. These delays will frequently be such that the Rx packet will not be received within the time slot allowed by the TDD synchronization signal SYNC or SYNC for its reception, resulting in loss of part of the Rx packet, as illustrated at the top of FIG. 14.

To overcome this problem, provision is made to apply an additional delay to the Rx packets in the receiver so that each is delayed by a full TDD cycle period, in this case 2 ms, or a multiple of that period, so as to ensure that they are received in the proper phase relationship with the transmission of the associated Tx packets. The data recovered by receiver 800 is applied to a clock recovery circuit 802, which recovers from the data a data bit rate clock signal and a strobe signal marking the beginning and end of each packet. The clock signal is used to clock data from the receiver 800 into a first-in, first-out (FIFO) register 804, when enabled by the recovered strobe signal, as illustrated by the adjacent timing diagram. Data can be clocked out of the FIFO 804 on a line 206 by a base station system clock signal 808 when the receiver is enabled by the signal SYNC or SYNC*, as the case may be, provided that a FIFO status line 810 indicates that the FIFO contains a complete Rx packet, i.e. the strobe signal is not active and the FIFO contains data. The received data packet can then be decoded and either converted to an analog signal, re-encoded as a Pulse Code Modulation (PCM) signal having an appropriate bit rate, or passed to a PAD 730 for further processing.

Whilst the transceivers in the system just described have commonly been referred to as handsets, it should be understood that the transceivers may be any of several forms, whether handheld, mobile, or even fixed where a conventional wired telephone circuit cannot conveniently be provided. Whilst an arrangement in which the CAI to the handsets uses a TDD format, the invention is also applicable to FDD formats, apart from those features specifically predicated upon the use of TDD. The nature of the telephone network to which the invention interfaces is significant only to the extent that the receivers and transmitters of the base station equipment must be provided with a suitable interface to the network.

It should further be understood that, rather than voice signals, the signals transmitted may be data or paging signals of any form conventionally routed over telephone or radio networks.

While the system shown in FIGS. 11–14, and particularly the RAD of FIG. 12, has been described as a broadband system in which bands of frequencies encompassing multiple channels are block converted between cable transport frequency bands and frequency bands utilized by the base station equivalent and the air interface served by the RADs, it is advantageous in some circumstances to utilize a modified RAD in which the frequency conversion subsystems 607 and 608 are narrow band, converting only the frequencies associated with a single frequency-agile air interface channel, from and to downstream and upstream frequencies associated with a single cable channel. Preferably the cable channel and the air channel are independently selectable so that frequency reuse on the cable system and frequency reuse on the air interface may be independently mapped.

In order to provide the RAD with narrow band capabilities the filters 618, 621, 640 and 650 are provided with suitable characteristics such as to pass a single channel, and filters 621, 640 and 650 may be made electronically tunable by signals 672, 674, and 676 from the controller 637 so as to pass a selected channel. If the first mixer 613 converts signals to a fixed intermediate frequency, the tuning of the filter 618 may be fixed, as may that of the amplifier 615, both being tuned to a narrower bandwidth than would be the case if they were to pass a band containing multiple channels. The filter 621 is tuned to reflect the frequency of a desired air interface transmission channel, while the local oscillators 614 and 621, which in common with the oscillators 644 and 651 are synthesizers phase-locked to a common reference frequency recovered from the downstream cable signal and applied to the controller 637 through the filter 627, amplifier 628 and coupler 629, generate frequencies required respectively to translate the frequency of a selected downstream cable channel to the intermediate frequency, and the intermediate frequency to a selected air interface transmission frequency. Likewise, the filter 640 is tuned to the selected air interface reception frequency which may or may not be the same as the transmission frequency depending on the form of multiplexing used by the air interface. The frequency of the oscillator 644 is controlled to provide conversion to an intermediate frequency from the selected air interface reception frequency, and the bandwidth of the amplifier 646 is restricted to provide single channel selectivity. The oscillator 651 and filter 650 are tuned to provide and pass a desired upstream cable channel.

The controller selects the frequency of the various local oscillators and variable filters in accordance with control signals recovered by the demodulator 630 and applied to the controller 637 which interprets the control signals incoming from the CATV system on a control channel and generates frequency control signals applied to the oscillators and variable filters. The control signals from the CATV system are generated by the microcontroller 756 (see FIG. 13) and reflect respectively the frequencies of downstream and upstream cable channels utilized by the base station translator shown in FIG. 13 to transmit and receive signals intended for exchange with a particular RAD, and the transmit and receive frequencies of an air channel to be utilized by that RAD. These signals pass over a forward control channel to the RAD. In order to provide further versatility in applications for the RAD, and to enable it to be used in conjunction with conventional static telephone equipment 686 and data equipment capable of communicating over telephone lines, a cellular-to-wired adaptor unit 680 of known type, such as the "Phonecell" (trademark) unit from Tellular, may be coupled to the RAD in place of the antenna 626 through a switch 682. In order to provide still greater versatility, the unit 680 may be integrated into the RAD and may be controlled by an output from the controller 637 to switch its radio frequency connection from the RAD to an antenna 684 at which point the adaptor functions as a conventional cellular or PCS unit utilizing an air interface. This control output is produced if the controller senses failure of the connection to the RAD through the CATV system, for example by detecting loss of signal the forward control channel recovered by demodulator 630.

Such a narrow band RAD may be constructed to handle either PCS or conventional cellular signals. It will normally be useful in circumstances in which it need only handle a connection to a single transceiver, conventional telephone or data set at a time. If a sufficient number of RADs with overlapping ranges is provided so that any point within a service area is within range of multiple RADs, but each individual RAD has very low power and restricted range, then the cellular or PCS service can be provided with very efficient frequency reuse patterns which can be controlled dynamically, since two RADs which are out of radio range of one another may operate on the same air channel while utilizing different cable channels, which means that air channels may be reused with an area serviced from a base station translation interface over the same segment of a cable system provided that different cable channels are available to carry those signals. This capability arises because cable channels for the carriage of PCS or cellular signals may be assigned independently of air interface channels, thus avoiding limitations on air frequency reuse being imposed by the geography of the cable system, which does not permit frequency reuse within that portion of a system extending downstream from a base station translator. At the same time it permits very efficient air frequency reuse since any one RAD will only be utilizing one channel at a time and will have a very limited range. Moreover, air interface channels may be dynamically reassigned without any change in the cable channel utilized and vice-versa, thus allowing either cable or air channels to be reassigned on the fly to overcome cable or air interference, or to optimize usage, according to any known transfer for cellular frequency reassignment, such as MAHO (Mobile Assisted Handoff), C/I (Carrier to Interface level), C/A (Carrier to Adjacent Carrier Level), BER (Bit Error Rate), WER (Wired Error Rate), BLER (Block Error Rate), as well as cable originating interface as from television signals. Such conditions are monitored in known manner and used to initiate frequency reassignments in a manner well known in cellular technology, except that cable originating conditions will trigger cable channel reassignments.

Narrow band operation of the RADs also has the advantage of improving signal-to-noise ratio through narrow band operation, and reducing the introduction of noise onto the cable system in the upstream direction, and the squelch amplifier 641 will suppress output onto the cable unless a signal of a level above a predetermined level is received on the channel to which the translator 608 is tuned. The use of narrow band RADs as described above facilitates the provision via cable to subscriber locations of conventional wired or cordless telephone service (this being taken to include data and paging services) using cellular switching and network infrastructure, but using cable television plant to convey telephone signals to and from a subscriber rather than substantially further loading the already congested radio spectrum allotted to cellular telephony.

In such a system, areas of cable television plant, sized as telephone usage warrants, are treated as cells as already described with reference to FIG. 11. Each such area serves both cordless and wired telephone subscribers through radio base station equipment and a translator as shown in FIG. 13. Each subscriber is provided with a RAD as described above, with an antenna 626 and/or an interface unit 680 as described above, according to whether cordless and/or fixed service is required. If fixed service is provided, appropriate telephone equipment 686 is connected to the adaptor 680, and in the absence of radio frequency leakage there is no usage of air spectrum. If cordless service is provided, the output power of the RAD, which will typically be incorporated into an indoors unit such as a television connector, will be made low enough to provide only a very limited range, for example 50 meters, so that frequencies may be reused to service quite closely spaced subscribers, and only a limited number of air channels need be dedicated to cordless service in a particular area. Such channels do not need such sophisticated management as regular cellular channels, since no hand-off facilities are required, and at least a default channel may be preallocated to any subscriber in accordance with suitable frequency reuse guidelines. The same channels may be used to service wired service subscribers, but frequency reuse considerations should in this case be of little concern provided that radio frequency leakage from the RADs is properly controlled. Since the telephones used to provide cordless service may be conventional cellular or PCS transceivers, they may also be used to provide a subscriber with regular cellular or PCS service when moved by a subscriber out of range of the subscriber's home RAD.

Some proposals for PCS digital service multiplex two voice channels and a control channel on a single air channel. If such a system is used in connection with a fixed location aired or cordless service as described above, both voice channels may be utilized together to provide a higher data rate and thus provide superior voice quality or high data throughput for data communication.

Cellular and PCS systems generally make use of control channels for cell paging and access purposes, and in any such system, a RAD must access a control channel. This may be a fixed control channel as shown or may entail physically duplicating a control channel in a number of different communication channels according to the control scheme utilized, although there will be only a limited number of "logical" control channels in a particular "cell".

Any particular narrow band RAD will be programmed, and typically retain in non-volatile memory, a particular cable channel or channels to which it should default and scan for communication with the base station, and in particular air channels to which it should default for the same purposes. In the case of wired or cordless service, these cable and air channels may be the same as default channels for communication.

The channel spacing and arrangement of the cable channels need not, when narrow band RADs are used, be the same as that of the air channels; not only can the number of channels accommodated within a given spectrum be increased by techniques such as the interleaving, described with reference to FIG. 14, but adjacent channels used in a given area may on cable be more closely spaced without mutual interference and intermodulation, because signal levels are low and closely controlled.

It will be understood that in a narrow band RAD, the controller 637 will have the additional functions of independently controlling the oscillators determining cable channel selection and air interface channel selection, and correspondingly retuning the filters 621, 640 and 650, as well as controlling switching of the adapter 680 to back-up mode using its own antenna in the event of cable failure (if this facility is provided). Although additional programming of the controller firmware will be required, this will be straightforward since it merely involves providing additional control functions similar to those already provided. The mixer frequencies required to establish desired combinations of downstream and upstream cable channel frequencies and transmit and receive air channel frequencies may be stored in a look-up table, with channel defaults stored in non-volatile memory. Typically, frequency agility, i.e. dynamic changing of air channels selected for communication can be controlled by making the controller responsive to the same signals employed in the cellular system implemented as are employed to select channels in the cellular transceivers.

As previously indicated, cable channels are selected independently so as to avoid channel reuse within a "a cell" of the cable television system serviced by a base station translator. Typically, a controller at the base station will shift the selected cable channel, from a default control channel used to initiate communications, to a vacant channel in accordance with known cellular technology but with consideration only of frequency usage considerations within the portion of the CATV system that it utilizes, and independent of the allocation of air interface channels, which allocation is governed by wireless spectrum reuse considerations. Where RADs are used to provide wired or cordless service to a subscriber location, frequency reuse is governed solely by the need to avoid interference between RADs, rather than by cell structure, and thus the air interface channels used for such service may be preallocated to avoid mutual interference or interference with channels used to cellular communications. Provision will still usually be needed to reallocate channels to accommodate service problems and the addition of new subscribers or channels to the service, and the RADs will also require frequency agility where they are also to provide conventional or PCS cellular coverage of an area as well as fixed location service. In the latter instance, allocation of cellular air channels must respect the cell structure of the air interface, while allocation of cable channels must respect the cable system "cell" connecting a base station location to its associated RADs.

Independent allocation of cable and air channels is conveniently implemented in a RAD such as that shown in FIG. 12, which uses double conversion in both downstream and upstream converters. In the downstream direction, the first conversion may be used to convert from the downstream cable frequency to an intermediate frequency, at which the desired selectivity may be applied by the filter 618, and the second conversion may be to convert from the intermediate frequency to the air transmission frequency. Conversely, in the upstream direction, there is an air frequency to intermediate frequency conversion, and an intermediate to cable frequency conversion.

We claim:

1. A remote antenna driver for establishing a radiotelephony link between (1) a bi directional CATV system connected to a base station and (2) a portable radiotelephone transceiver, using at least one channel within a portion of the radio frequency spectrum, the remote antenna driver comprising:

a) at least one antenna;

b) a receiver having a first frequency converter including:
  b1) a first local oscillator, for converting signals received from the portable transceiver by said antenna in said portion of the radio frequency spectrum to first intermediate frequency signals, and
  b2) a second local oscillator for converting said first intermediate frequency signals to signals in a portion of the frequency spectrum allocated in the CATV system for upstream communications;

c) an interface for applying said converted signals to the CATV system as upstream signals;

d) a transmitter having second frequency conversion means including:
  d1) a third local oscillator for converting downstream signals received from said CATV system for transmission in a portion of the frequency spectrum allocated in the CATV system for downstream communications to second intermediate frequency signals, and
  d2) a fourth local oscillator for converting said second intermediate frequency signals to signals in said portion of the radio frequency spectrum, wherein said transmitter applies said converted downstream signals to said at least one antenna;

e) a circuit for extracting a reference frequency from a signal applied to said circuit; and f) a controller for maintaining the frequency of the first through fourth local oscillators coherent with respect to the reference frequency.

2. A remote antenna driver according to claim 1, wherein:

the portions of the radio frequency spectrum have a bandwidth restricted to a single channel;

the frequency of the first local oscillator is controlled to convert a selected reception channel within the radio frequency spectrum to the first intermediate frequency which is fixed, the frequency of the second local oscillator is controlled to convert the first intermediate frequency to a selected upstream channel in the CATV system, the frequency of the third local oscillator is controlled to convert a selected downstream channel in the CATV system to the second intermediate frequency which is fixed, and the fourth local oscillator is controlled to convert the second intermediate frequency to a selected transmission channel within the radio frequency spectrum.

3. A remote antenna driver according to claim 2, wherein:

the frequencies of the first and fourth oscillators are controlled in accordance with radio frequencies allocated to the reception and transmission channels, and the frequencies of the second and third oscillators are selected for each channel to avoid reuse of communication channels within the CATV system.

4. A remote antenna driver according to claim 2, including:

a cellular-to-wired converter connectable in place of said antenna.

5. A radiotelephone interface for communicating with transceivers in a defined area, the interface comprising:

a) base station equipment;

b) a bidirectional cable television system connecting the base station equipment to a plurality of antenna drivers;

c) means for remapping the base station equipment to the area of coverage of the defined area by frequency division multiplex transmission of transmitted and received signals between the base station equipment and the antenna drivers over the cable television system in frequency bands reserved in the cable television system for downstream and upstream communications, respectively;

d) the plurality of antenna drivers, including:

d1) first frequency converter means for converting transmitted signals from a selected channel in the band reserved for downstream signals to a transmission frequency for application to the antenna corresponding to an independently selected air interface transmission channel, and d2) second frequency converter means for converting signals received by the antenna in a selected air interface reception channel to a frequency corresponding to an independently selected channel in the band reserved for upstream signals; and e) means applying a common reference frequency to the frequency converters to provide frequency coherency among the frequency converters.

6. A telephone interface according to claim 5, wherein:

the transceivers include cellular telephones, and an antenna is connected to each driver servicing cellular telephones.

7. A telephone interface according to claim 5, wherein:

at least some antenna drivers are connected to cellular-to-wired converters, and the transceivers include conventional wired telephone equipment connected to said converters.

8. A remote antenna driver for establishing a radiotelephony link between a bi directional CATV system connected to a base station and a portable radiotelephone transceiver using at least one channel within a portion of the radio frequency spectrum, the remote antenna driver comprising:

a) at least one antenna;

b) a receiver having a first frequency converter including a first local oscillator for converting signals received from the portable transceiver by the antenna in the portion of the radio frequency spectrum to a portion of the frequency spectrum allocated in the CATV system for upstream communications;

c) an interface for applying the converted signals to the CATV system as upstream signals;

d) a transmitter having second frequency converter including a second local oscillator for converting downstream signals received from the CATV system for transmission in a portion of the frequency spectrum allocated in the CATV system for downstream communications to the portion of the radio frequency spectrum, the transmitter applying the converted downstream signals to the at least one antenna;

e) a circuit for extracting a reference frequency from a pilot signal applied to the circuit; and f) a controller for maintaining the frequency of the first and second local oscillators coherent with respect to the reference frequency.

9. A remote antenna driver according to claim 8, wherein;

the controller constitutes means for deriving a synchronizing signal from the pilot signal; and the controller further includes a multiplexing switch driven by the synchronizing signal to connect the at least one antenna alternately to the receiver and the transmitter.

10. A remote antenna driver according to claim 9, wherein:

the receiver includes a squelch circuit.

11. A remote antenna driver according to claim 8, wherein the controller includes:

means for receiving a sample of the signal input to the transmitter from the CATV system;

means for determining its level to determine path losses across the CATV system; and means for controlling output levels of the transmitter and receiver accordingly.

12. A remote antenna driver according to claim 8, further comprising:

a circuit that extracts control signals from the signal that is input to the transmitter from the CATV system, and that applies the control signals to the controller.

13. A radiotelephone interface for communicating with a portable radiotelephone transceiver in a defined area, the interface comprising:

a) base station equipment;

b) a bi directional cable television (CATV) system connecting the base station equipment to a plurality of remote antenna drivers;

c) means for remapping the base station equipment to an area of coverage of the defined area by frequency division multiplex transmission of transmitted and received signals between the base station equipment and the remote antenna drivers over the CATV system in frequency bands reserved in the CATV system for downstream and upstream communications, respectively; and d) the plurality of remote antenna drivers, each of the plurality of remote antenna drivers for establishing a radiotelephony link between the CATV system and a portable radiotelephone transceiver using at least one channel within a portion of the radio frequency spectrum, and including:

1) at least one antenna;

2) a receiver having a first frequency converter including a first local oscillator for converting signals received from the portable transceiver by the antenna in the portion of the radio frequency spectrum to a portion of the frequency spectrum allocated in the CATV system for upstream communications;

3) an interface for applying the converted signals to the CATV system as upstream signals;

4) a transmitter having second frequency converter including a second local oscillator for converting downstream signals received from the CATV system for transmission in a portion of the frequency spectrum allocated in the CATV system for downstream communications to the portion of the radio frequency spectrum, the transmitter applying the converted downstream signals to the at least one antenna;

5) a circuit for extracting a reference frequency from a pilot signal applied to the circuit; and 6) a controller for maintaining the frequency of the first and second local oscillators coherent with respect to the reference frequency.

14. The interface of claim 13, wherein:

the controller constitutes means for deriving a synchronizing signal from the pilot signal; and the controller further includes a multiplexing switch driven by the synchronizing signal to connect the at least one antenna alternately to the receiver and the transmitter.

15. The interface of claim 14, wherein:

the receiver includes a squelch circuit.

16. The interface of claim 13, wherein the controller includes:

means for receiving a sample of the signal input to the transmitter from the CATV system;

means for determining its level to determine path losses across the CATV system; and means for controlling output levels of the transmitter and receiver accordingly.

17. The interface of claim 13, further comprising:

a circuit that extracts control signals from the signal that is input to the transmitter from the CATV system, and that applies the control signals to the controller.

* * * * *